United States Patent
Hara et al.

(10) Patent No.: US 9,930,583 B2
(45) Date of Patent: Mar. 27, 2018

(54) MOBILE TERMINAL APPARATUS, CONTROL METHOD, AND COMPUTER PRODUCT

(71) Applicant: FUJITSU LIMITED, Kawasaki-shi, Kanagawa (JP)

(72) Inventors: Yasushi Hara, Kunitachi (JP); Akemi Toyokura, Kawasaki (JP); Yuichi Miura, Sapporo (JP); Masao Hara, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 204 days.

(21) Appl. No.: 14/718,849

(22) Filed: May 21, 2015

(65) Prior Publication Data
US 2015/0257062 A1 Sep. 10, 2015

Related U.S. Application Data

(63) Continuation of application No. PCT/JP2012/081068, filed on Nov. 30, 2012.

(51) Int. Cl.
*H04W 36/00* (2009.01)
*H04W 36/14* (2009.01)
(Continued)

(52) U.S. Cl.
CPC ....... *H04W 36/0083* (2013.01); *H04W 36/14* (2013.01); *H04W 36/245* (2013.01); *H04W 84/12* (2013.01)

(58) Field of Classification Search
CPC .......................... H04W 36/0083; H04W 84/12
See application file for complete search history.

(56) References Cited

U.S. PATENT DOCUMENTS

2005/0255847 A1 11/2005 Han et al.
2007/0217383 A1 9/2007 Mitani
(Continued)

FOREIGN PATENT DOCUMENTS

JP 2004-241937 8/2004
JP 2005-333648 12/2005
(Continued)

OTHER PUBLICATIONS

International Preliminary Report on Patentability dated Feb. 19, 2013 in corresponding international application PCT/JP2012/081068.

(Continued)

*Primary Examiner* — Yemane Mesfin
*Assistant Examiner* — Henry Baron
(74) *Attorney, Agent, or Firm* — Staas & Halsey LLP

(57) ABSTRACT

A mobile terminal apparatus includes first communications circuitry that connects to a network through an access point; a storage device storing connection history information that includes entries associating area identification information that identifies a communication area of a base station to which second communications circuitry connects, network identification information that identifies the network, and access point identification information that identifies an access point that connected to the network in the communication area; and a processor that when in a communication area of a first base station identified by first area identification information, the first communications circuitry is connected to a first network identified by first network identification information, determines whether an entry that includes the first area identification information and the first network identification information together with different access point identification information has been retrieved from the connection history information and based on this determination, controls the first communications circuitry.

8 Claims, 18 Drawing Sheets

(51) Int. Cl.
*H04W 84/12* (2009.01)
*H04W 36/24* (2009.01)

(56) References Cited

U.S. PATENT DOCUMENTS

| | | |
|---|---|---|
| 2007/0217384 A1 | 9/2007 | Mitani |
| 2008/0119192 A1 | 5/2008 | Miyata |
| 2010/0008285 A1 | 1/2010 | Kuroda |
| 2010/0246529 A1* | 9/2010 | Ishizu .................. H04W 48/20 370/331 |
| 2010/0303051 A1* | 12/2010 | Umeuchi .............. H04W 48/16 370/338 |

FOREIGN PATENT DOCUMENTS

| | | |
|---|---|---|
| JP | 2007-166412 | 6/2007 |
| JP | 2007-251652 | 9/2007 |
| JP | 2007-251654 | 9/2007 |
| JP | 2008-131069 | 6/2008 |
| JP | 2010-021765 | 1/2010 |
| JP | 2011-049787 | 3/2011 |
| JP | 2012-090245 | 5/2012 |
| JP | 2012-231516 | 11/2012 |

OTHER PUBLICATIONS

Office Action of R.O.C Patent Application 102131654 dated Feb. 12, 2015.
International Search Report dated Feb. 19, 2013 in corresponding international application PCT/JP2012/081068.

* cited by examiner

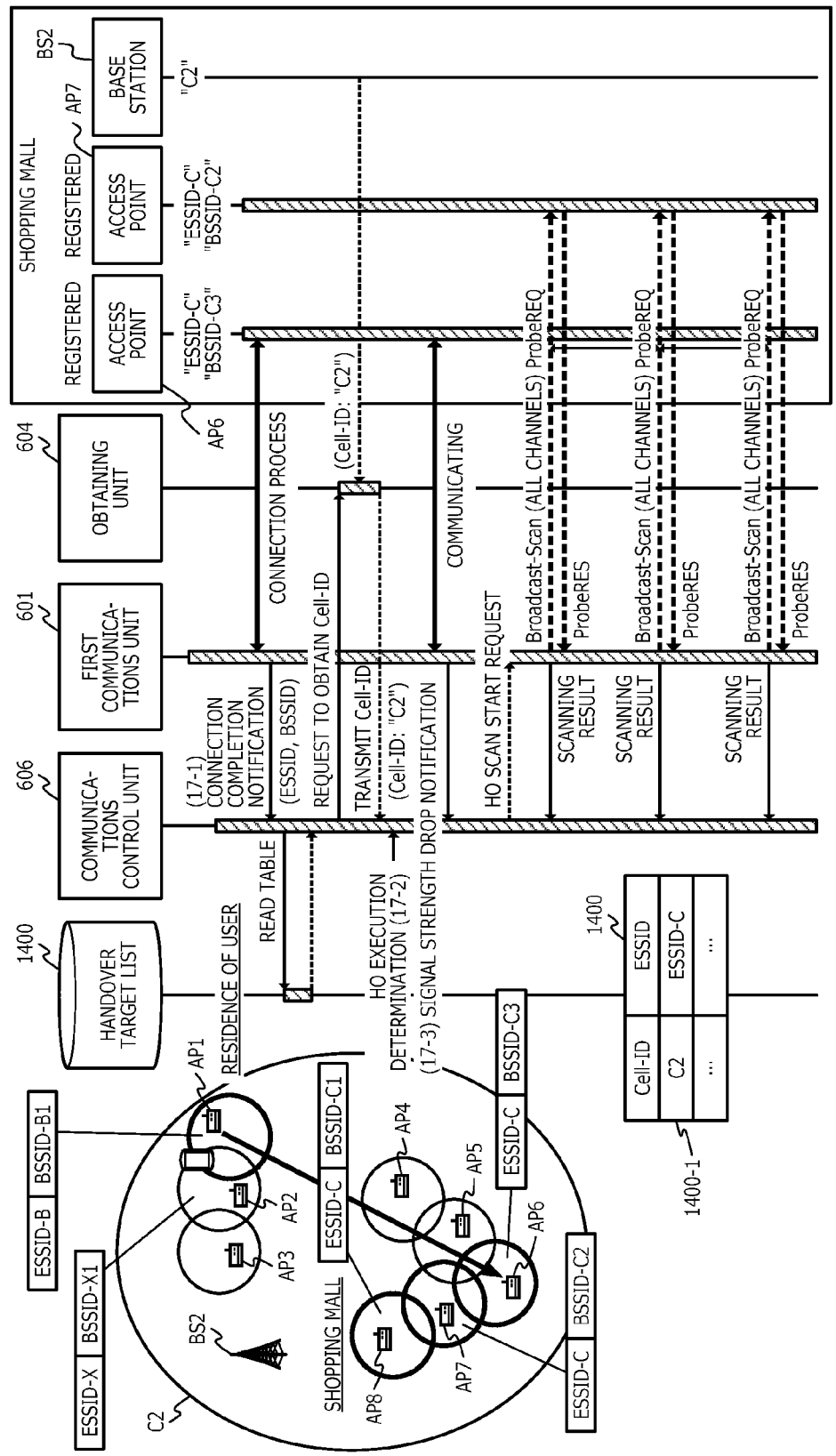

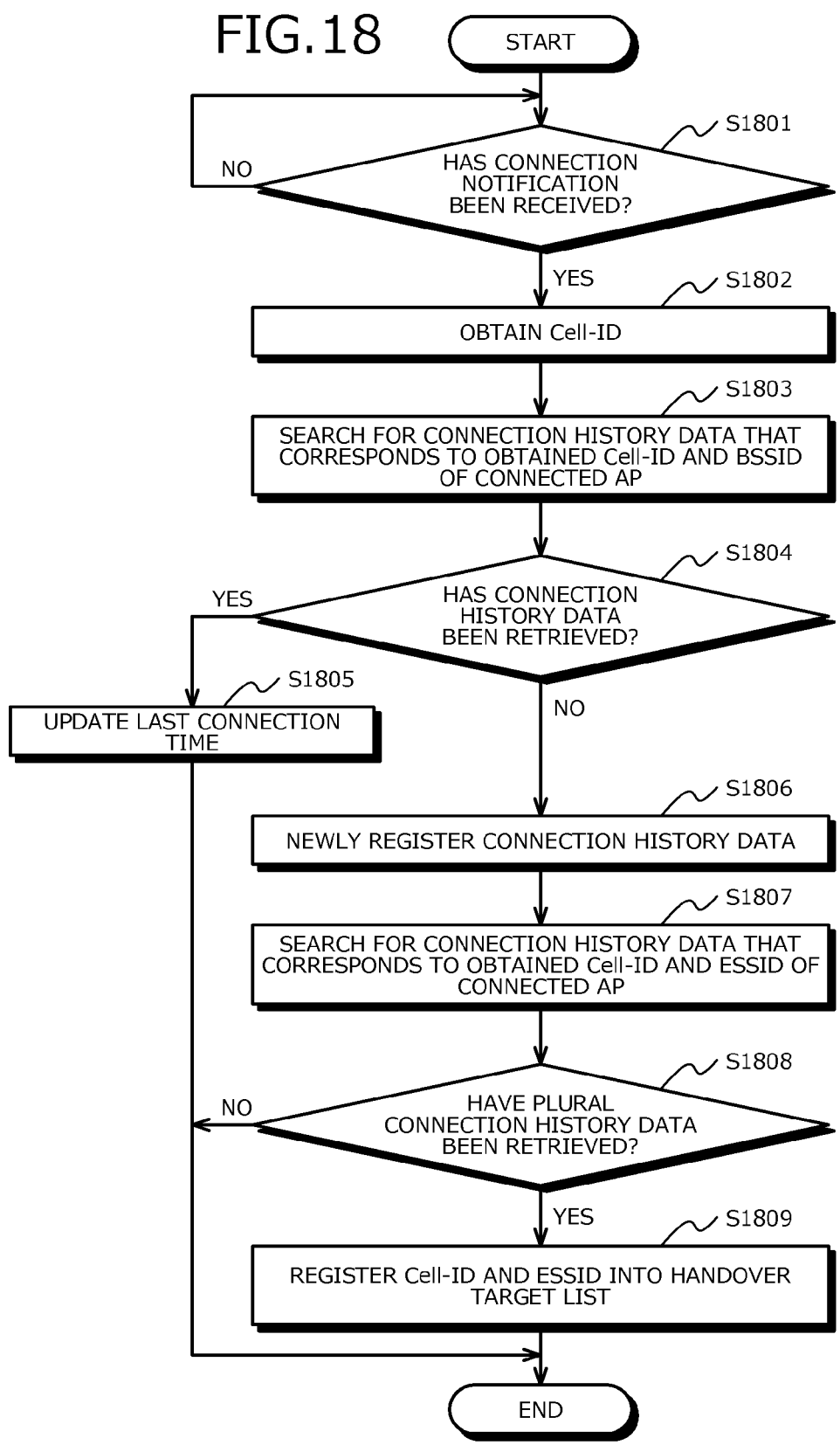

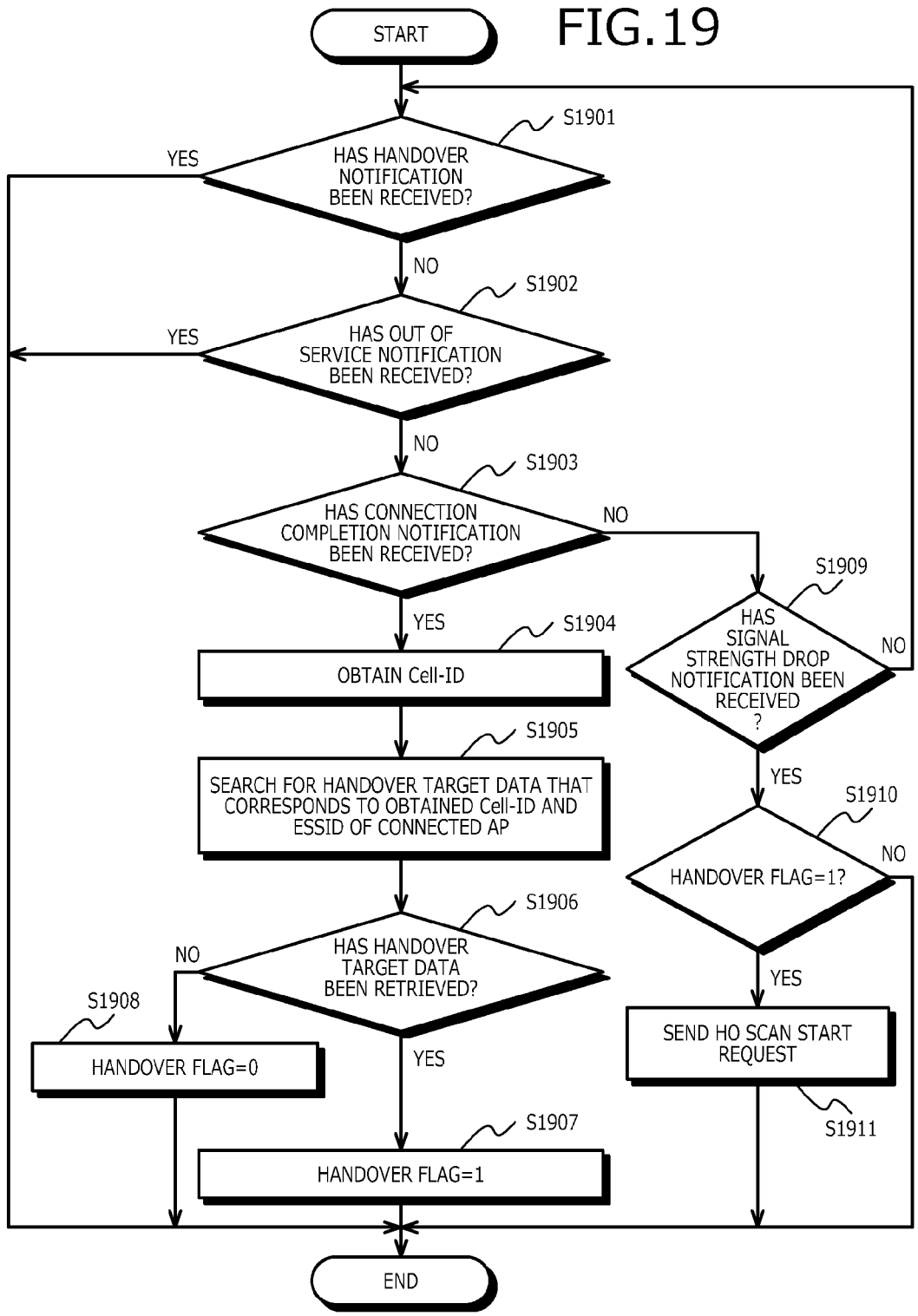

MOBILE TERMINAL APPARATUS, CONTROL METHOD, AND COMPUTER PRODUCT

CROSS REFERENCE TO RELATED APPLICATIONS

This application is a continuation application of International Application PCT/JP2012/081068, filed on Nov. 30, 2012 and designating the U.S., the entire contents of which are incorporated herein by reference.

FIELD

The embodiments discussed herein are related to a mobile terminal apparatus, a control method, and a computer product.

BACKGROUND

A conventional mobile terminal apparatus has a communications function of connecting to a wireless local area network (LAN). The mobile terminal apparatus, for example, can connect to a network, such as the Internet, through wireless LAN access points provided in various areas.

A related technique, for example, compares a threshold and the SNR value generated based on a beacon frame signal received from a nearby AP, classifies the nearby AP as a detection AP, a candidate AP, or a target AP, and based on the classification, determines an AP for performing handover. Further, according to another technique, a mobile terminal transmits a probe request frame to plural base stations and receives a probe response frame from each base station, whereby the mobile terminal uses the reception level of the probe response frame as a reference and determines the next base station for handover.

According to another technique, a wireless LAN terminal apparatus judges the necessity of handover based on base station information of a detected base station and a first base station with which the wireless LAN terminal apparatus is currently associated. If handover is necessary, the wireless LAN terminal apparatus determines a second base station from among base stations and associates the wireless LAN terminal apparatus with the second base station. According to yet another technique, when response messages received from connectable relay apparatuses do not include information coinciding with the apparatus identification information of the connected relay apparatus, the communications apparatus requests connection to a relay apparatus whose apparatus identification information is included in a received response message.

According to another technique, a wireless LAN mobile station measures the communication quality of information communicated with a wireless LAN base station and upon judging that the measured communication quality is less than a given communication quality, the wireless LAN mobile station increases by a given value, a threshold serving as a reference for executing handover. According to yet another technique, a wireless LAN mobile station counts the number of times handover is executed per unit time and according to the counted number of executions, varies a threshold that serves as a reference for executing handover. According to a further technique, a wireless LAN terminal connected to a wireless access point supplies from a key information registry (KIR), a communications parameter of a nearby wireless access point before roaming to a second wireless access point near the wireless access point actually becomes necessary.

For examples of such conventional techniques refer to Japanese Laid-Open Patent Publication Nos. 2005-333648, 2007-166412, 2008-131069, 2010-021765, 2007-251652, 2007-251654, and 2004-241937.

Nonetheless, with the conventional techniques above, a problem arises in that scanning operations to search for the next access point for handover when the reception signal strength of a signal received from the connected access point drops invites increases in the power consumption of the mobile terminal apparatus.

SUMMARY

According to an aspect of an embodiment, a mobile terminal apparatus includes first communications circuitry that connects to a network through an access point; a storage device storing therein connection history information that includes plural entries respectively associating area identification information that identifies a communication area of a base station to which second communications circuitry connects, network identification information that identifies the network, and access point identification information that identifies an access point that connected to the network in the communication area; and a processor that when in a communication area of a first base station identified by first area identification information, the first communications circuitry is connected to a first network identified by first network identification information, determines whether an entry that includes the first area identification information and the first network identification information together with different access point identification information has been retrieved from the connection history information. The processor controls the first communications circuitry based on a determination result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 is a diagram depicting an example of the third control process of the mobile terminal apparatus 101 according to the second embodiment;

FIG. 18 is a flowchart depicting an example of a procedure of the updating process of the mobile terminal apparatus 101 according to the second embodiment; and FIG. 19 is a flowchart depicting an example of a procedure of the second control process of the mobile terminal apparatus 101 according to the second embodiment.

DESCRIPTION OF EMBODIMENTS

Embodiments of a mobile terminal apparatus, a control method, and a control program will be described in detail with reference to the accompanying drawings.

Figure 1:
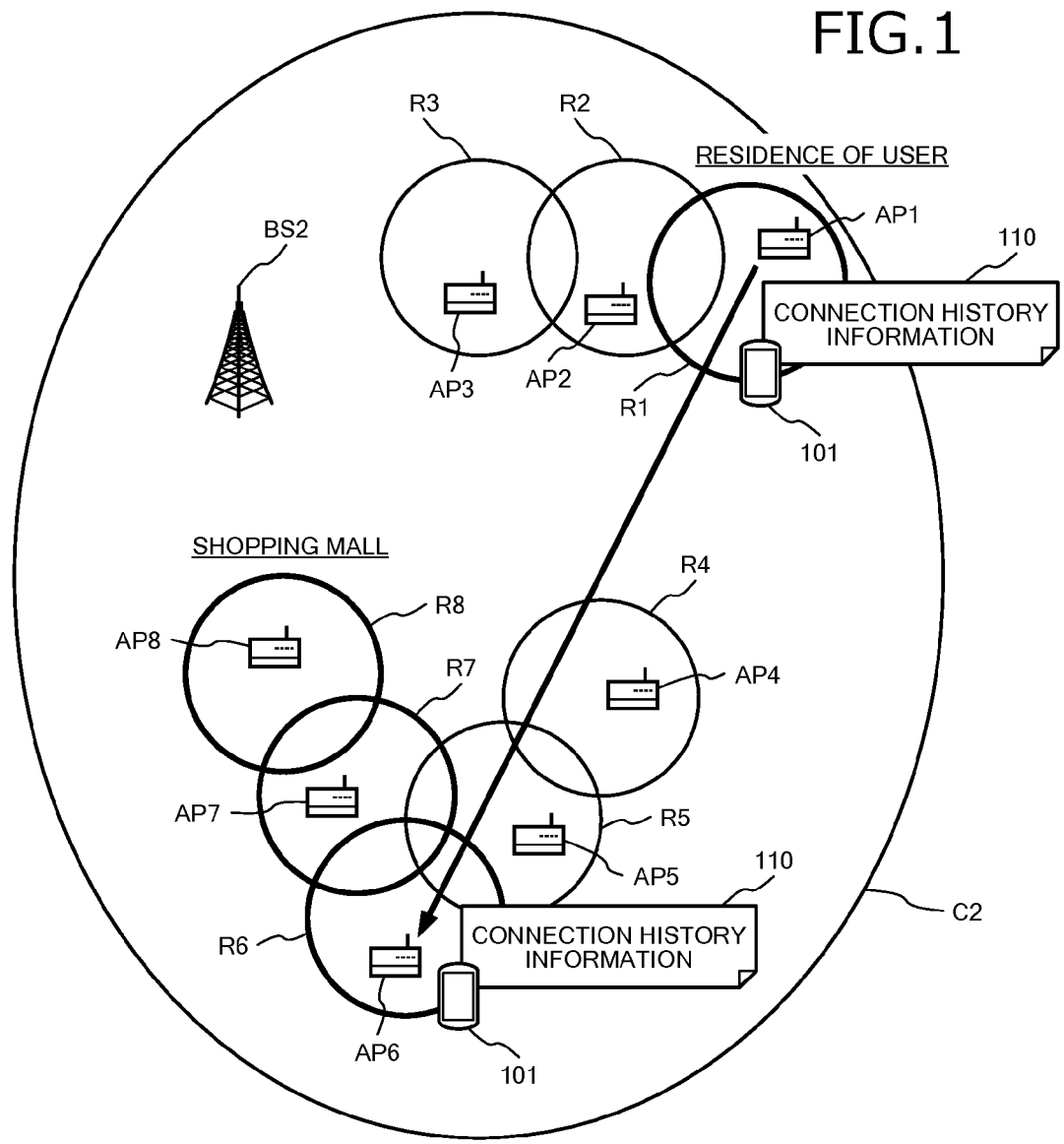
FIG. 1 is a diagram depicting an example of a control method according to a first embodiment.

FIG. 1 is a diagram depicting an example of a control method according to a first embodiment. In FIG. 1, a mobile terminal apparatus 101 is a computer that can wirelessly communicate with access points AP (access points AP1 to AP8 in the example depicted in FIG. 1) and a base station BS (base station BS2 in the example depicted in FIG. 1). More specifically, for example, the mobile terminal apparatus 101 is a smartphone, a mobile telephone, a tablet-type personal computer (PC), a Personal Handy-phone System (PHS) device, and the like.

The access points AP are capable of wirelessly communicating with mobile terminal apparatuses 101 located in a communication area R (communication areas R1 to R8 in the example depicted in FIG. 1) and are wireless stations serving as a hub for the mobile terminal apparatus 101 to connect to a network. More specifically, for example, access points AP are, for example, wireless LAN access points interspersed in various regions.

The base station BS is capable of wirelessly communicating with the mobile terminal apparatus 101 located in a cell C (cell C2 in the example depicted in FIG. 1) and is a wireless station serving as a hub for the mobile terminal apparatus 101 to connect to a network. The cell C is the communication area of the base station BS. More specifically, for example, base station BS is a base station of a mobile communications network (e.g., a mobile telephone network) and is interspersed in various regions.

The access points AP include access points that the mobile terminal apparatus 101 can use and access points that the mobile terminal apparatus 101 cannot use. Consequently, the mobile terminal apparatus 101 performs scanning operations to search for an access point AP capable of wireless communication and connects to a network through an access point AP among found the access points AP.

The mobile terminal apparatus 101 further performs scanning operations to search for a base station BS capable of wireless communication and can connect to a network through a found base station BS. The network, for example, is a mobile communications network, a LAN, a wide area network (WAN), the Internet, and the like.

The mobile terminal apparatus 101 has connection history information 110. Here, the connection history information 110 is information that identifies the cell C in which a process of connection from the mobile terminal apparatus 101 to an access point AP was performed. The process of connecting to an access point AP is a process of connecting to a network through the access point AP.

More specifically, for example, the connection history information 110 is information that includes entries of associated area identification information of a base station BS, network identification information of an access point AP, and access point identification information of the access point AP that connected to a network, in the cell C of the base station BS.

The area identification information of the base station BS is information that uniquely identifies the cell C of the base station BS and, for example, is the cell-ID described hereinafter. The network identification information of the access point AP is information that identifies the network to which connection is made through the access point AP. The network identification information, for example, is the extended service set identifier (ESSID) of the access point AP. The access point identification information of the access point AP is information that uniquely identifies the access point AP. The access point identification information, for example, is the basic service set identifier (BSSID) of the access point AP.

Here, the same network identification information may be given to plural access points AP. If an access point among access points given the same network identification information can be used by the mobile terminal apparatus 101, the other access points AP given the same network identification information can be used.

Examples of access points given the same network identification information include, for example, a set of access points having the same available communication service, a set of access points AP respectively installed at shops managed by a given company, etc. For example, in an establishment such as a shopping mall or university, to establish a wider communications area and enable seamless wireless communication, access points AP given the same network identification information may be provided adjacent to one another.

The mobile terminal apparatus 101 has a function of switching the access point AP to which connection is made, i.e., of performing "handover". The access point AP to which connection is made is an access point serving as a hub for connecting to a network. More specifically, for example, the mobile terminal apparatus 101 switches the access point AP to which connection is made, to an access point having a higher received signal strength indication (RSSI).

More specifically, for example, the mobile terminal apparatus 101, which is connected to a first access point, may receive a signal from an available second access point. In this case, the mobile terminal apparatus 101 obtains the difference of the RSSI strengths of the signals received from the first and the second access points. If the difference of the RSSI strengths is a given value or greater, the mobile terminal apparatus 101 switches the access point AP to which connection is made from the first access point to the second access point, provided that the RSSI strength of the second access point is greater than that of the first access point.

Here, if the mobile terminal apparatus 101 performs handover, the mobile terminal apparatus 101 performs scanning operations of searching for destination access point AP for handover. Meanwhile, in a vicinity of the mobile terminal apparatus 101, an available access point AP different from the access point AP connected to may not be present. In this case, from the perspective of power consumption, it is not desirable for the mobile terminal apparatus 101 to perform scanning operations to search for a destination access point AP for handover.

Thus, in the present embodiment, the mobile terminal apparatus 101 exploits the possibility that an access point AP having the same network identification information may be provided nearby and controls the scanning operations of searching for a destination access point AP for handover.

More specifically, for example, the mobile terminal apparatus 101 ascertains whether in the cell C to which the mobile terminal apparatus 101 belongs, another access point AP is present that has the same network identification information as the access point AP to which the mobile terminal apparatus 101 is connected. Here, if another such access point AP is present, the mobile terminal apparatus 101 ascertains that nearby, a destination access point AP for handover is present and performs scanning operations to search for a destination access point AP for handover.

Hereinafter, control of the mobile terminal apparatus 101 according to the first embodiment will be described.

In FIG. 1, the access point AP1 is an access point AP provided at the residence of the user of the mobile terminal apparatus 101 and is an access point AP that can be used by the mobile terminal apparatus 101. Further, in FIG. 1, the access points AP6 to AP8 are access points AP provided in a shopping mall and are access points AP that can be used by the mobile terminal apparatus 101. The same network identification information is given to the access points AP6 to AP8.

In a first control example, in the cell C2 of the base station BS2, the mobile terminal apparatus 101 is assumed to connect to a network through the access point AP1 provided at the residence of the user. In this case, the mobile terminal apparatus 101 searches the connection history information 110 for an entry that includes the area identification information of the base station BS2 and the network identification information of the access point AP1 together with different access point identification information.

Here, in the example depicted in FIG. 1, no access point AP having the same network identification information as the access point AP1 is present in the cell C2. Therefore, only the entry that includes the area identification information of the base station BS2, the network identification information of the access point AP1, and the access point identification information of the access point AP1 is retrieved.

If plural entries are not retrieved, compared to a case where plural entries are retrieved, the possibility of another access point AP having the same network identification information as the connected access point AP1 being near the mobile terminal apparatus 101 can be said to be low. In other words, if plural entries are not retrieved, the possibility of a destination access point AP for handover being present near the mobile terminal apparatus 101 is low. Therefore, the mobile terminal apparatus 101 does not perform scanning operations to search for a destination access point AP for handover.

In a second control example, in the cell C2 of the base station BS2, the mobile terminal apparatus 101 is assumed to be connected to a network through the access point AP6 provided at the shopping mall. In this case, the mobile terminal apparatus 101 searches the connection history information 110 for an entry that includes the area identification information of the base station BS2 and the network identification information of the access point AP6 together with different access point identification information.

In the example depicted in FIG. 1, the access points AP7 and AP8 having the same network identification information as the access point AP6 are present in the cell C2. Therefore, three entries having the area identification information of the base station BS2 and the network identification information of the access point AP6 together with different access point identification information are retrieved.

If plural entries are retrieved, compared to a case where plural entries are not retrieved, the possibility of another access point AP having the same network identification information as the connected access point AP6 can be said to be high. In other words, if plural entries are retrieved, the possibility of a destination access point AP for handover being near the mobile terminal apparatus 101 is high. Therefore, the mobile terminal apparatus 101 starts scanning operations to search for a destination access point AP for handover.

In this manner, whether another access point AP having the same network identification information as that of the connected access point AP is present nearby can be ascertained by the mobile terminal apparatus 101. Thus, it can be ascertained whether another available access point AP other than the connected access point AP is present in a vicinity of the mobile terminal apparatus 101.

The mobile terminal apparatus 101 enables scanning operations of searching for a destination access point AP for handover to be performed when another available access point AP is present nearby. As a result, if the strength of the signal from the connected access point AP drops, a destination access point AP for handover can be searched for and the connection destination can be switched, enabling ubiquity to be established.

The mobile terminal apparatus 101 does not perform the scanning operations of searching for a destination access point AP for handover when no other available access point AP is present nearby. As a result, the power consumed for scanning operations in situations where no destination access point AP for handover is present can be saved.

An example of system configuration of a communications system 200 according to the first embodiment will be described. Description hereinafter will be given taking a wireless LAN access point as an example of an access point AP.

Figure 2:
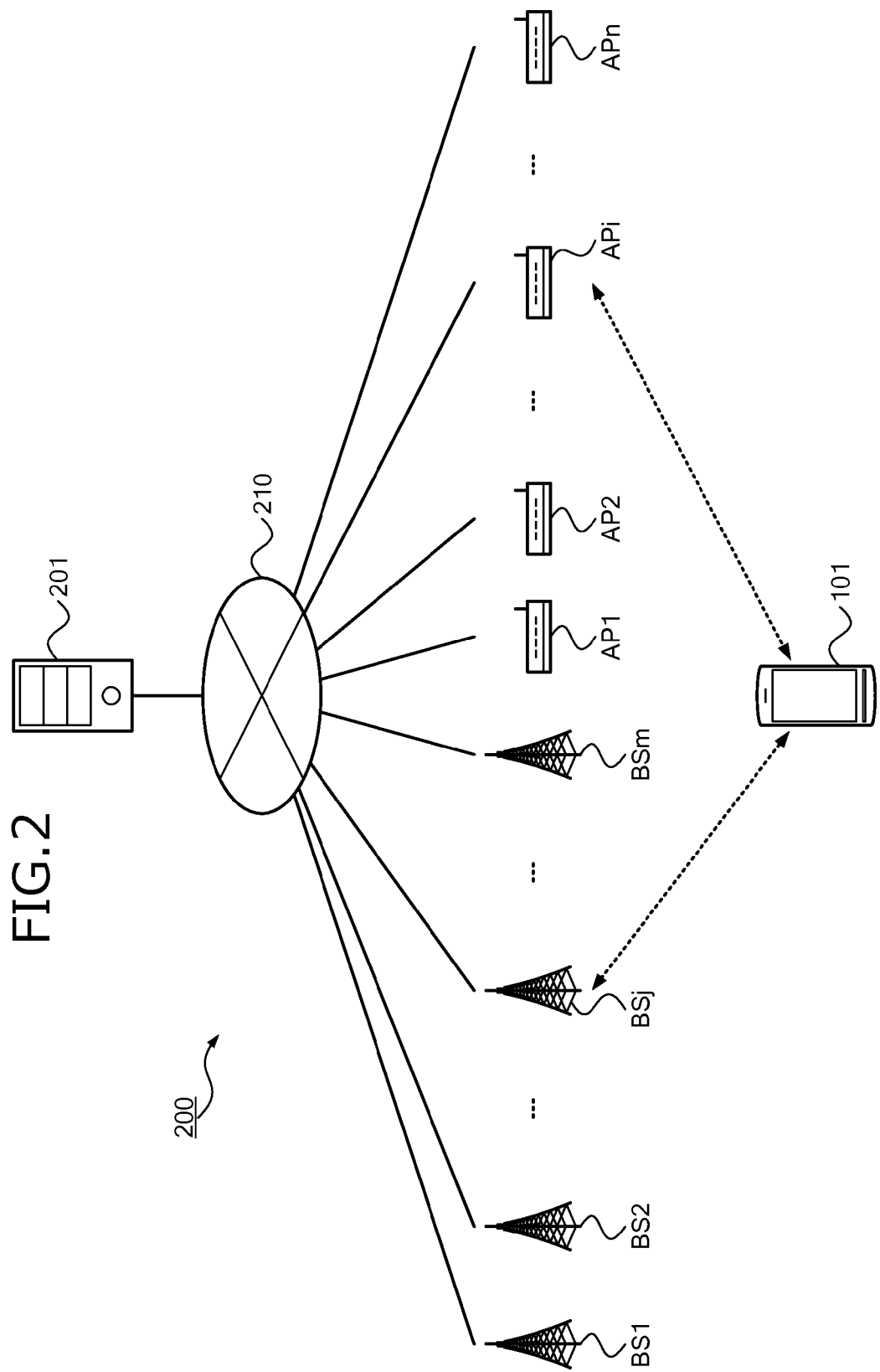
FIG. 2 is a diagram depicting an example of system configuration of a communications system 200.

FIG. 2 is a diagram depicting an example of system configuration of the communications system 200. In FIG. 2, the communications system 200 includes the mobile terminal apparatus 101, base stations BS1 to BSm, access points AP1 to APn, and a server 201. In the communications system 200, the base stations BS1 to BSm, the access points AP1 to APn, and the server 201 are connected through a network 210. The network 210, for example, includes a mobile communications network, a LAN, a WAN, the Internet, and the like.

In the present example, the base stations BS1 to BSm are base stations of a mobile communications network (mobile telephone network), interspersed in various regions. In the description hereinafter, an arbitrary base station among the base stations BS1 to BSm may be indicated as a "base station BSj" and a communication area representing the communicable range of the base station BSj may be indicated as a "cell Cj" (where, j=1, 2, . . . , m).

The access points AP1 to APn are wireless LAN base stations interspersed in various regions. The access points AP1 to APn may include access points (e.g., access points supporting Hotspot2.0) that automatically establish connection with the mobile terminal apparatus 101, without the user manually performing registration or authentication processes with respect to the available access point. The access points AP1 to APn may further include portable access points and access points provided on mobile vehicles such as trains and buses.

In the description hereinafter, an arbitrary access point among the access points AP1 to APn may be indicated as an "access point APi", and a communication area representing the communicable range of the access point APi may be indicated as a "communication area Ri" (where, i=1, 2, . . . , n).

The mobile terminal apparatus 101 can wirelessly communicate with a base station BSj in a cell Cj and can connect to the network 210 through the base station BSj. Further, the mobile terminal apparatus 101 can wirelessly communicate with an access point APi in a communication area Ri and can connect to the network 210 through the access point APi.

The server 201 is a computer that provides a service to the mobile terminal apparatus 101 through the network 210. A service is information processing provided to the mobile terminal apparatus 101 and, for example, may be an email service, a telephone service, a web service, and the like. More specifically, for example, the server 201 includes an email server, a web server, an application server, a database server, and the like.

In FIG. 2, although the mobile terminal apparatus 101 and the server 201 are respectively depicted as a single apparatus, configuration is not limited hereto. For example, the mobile terminal apparatus 101 may be provided for each user of the communications system 200 and the server 201 may be provided for each service provider.

Figure 3:
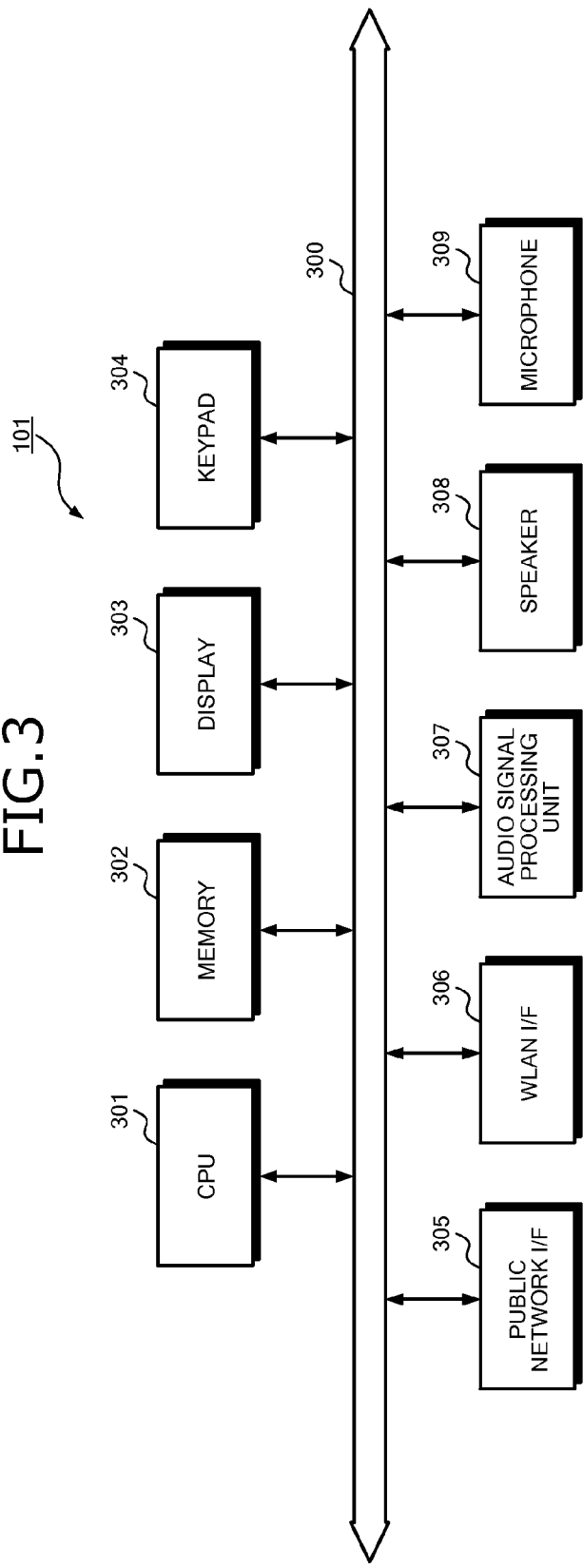
FIG. 3 is a block diagram depicting an example of hardware configuration of a mobile terminal apparatus 101.

FIG. 3 is a block diagram depicting an example of hardware configuration of the mobile terminal apparatus 101. In FIG. 3, the mobile terminal apparatus 101 includes a central processing unit (CPU) 301, memory 302, a display 303, a keyboard 304, a public network interface (I/F) 305, a wireless LAN (WLAN) I/F 306, an audio signal processing unit 307, a speaker 308, and a microphone 309, respectively connected by a bus 300.

The CPU 301 governs overall control of the mobile terminal apparatus 101. The memory 302, for example, includes read-only memory (ROM), random access memory (RAM), flash ROM, etc. More specifically, for example, the flash ROM stores an operating system (OS) program; the ROM stores application programs, and the RAM is used as work area of the CPU 301. Programs stored in the memory 302 are loaded onto the CPU 301, whereby encoded processes are executed by the CPU 301.

The display 303 displays data such as documents, images, and functional information, in addition to a cursor, icons, and toolboxes. A liquid crystal display, an organic electroluminescence (EL) display, and the like may be adopted as the display 303, for example.

The keyboard 304 has keys for inputting text, numerals, and various instructions; and performs data input. The keyboard 304 may be, for example, a touch panel input pad or numeric keypad, electronic keys, or the like.

The public network I/F 305 is connected to the network 210 through the base station BSj of a mobile communications network and is connected to other computers (e.g., the server 201) through the network 210. The public network I/F 305 administers an internal interface with the network 210 and controls the input of data from and the output of data to the other computers.

The WLAN I/F 306 is connected to the network 210 through the access point APi of a wireless LAN and is connected to other computers through the network 210. The WLAN I/F 306 administers an internal interface with the network 210 and controls the input of data from and the output of data to the other computers.

The audio signal processing unit 307 is connected to the speaker 308 and the microphone 309. For example, sound received by the microphone 309 is A/D converted by the audio signal processing unit 307. The speaker 308 outputs sound.

Although not depicted, in addition to the configuration above, the mobile terminal apparatus 101 may further include, for example, a memory controller that controls the reading and writing of data with respect to the memory 302, a power management unit (PMU) that supplies source voltage to the components, a battery, various timers, a global positioning system (GPS) unit, etc. The hardware configuration of the base station BSj, the access point APi, and the server 201, for example, is realized by the CPU, the memory, the I/F, an auxiliary storage device, the bus, etc.

A connection AP table 400 used by the mobile terminal apparatus 101 will be described. The connection AP table 400, for example, is realized by the memory 302 depicted in FIG. 3. The connection history information 110 depicted in FIG. 1 corresponds to the connection AP table 400.

Figure 4:
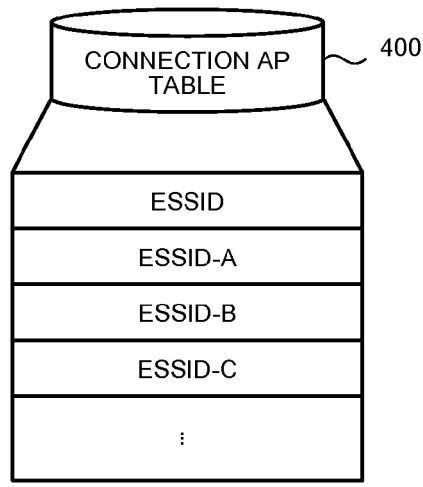
FIG. 4 is a diagram depicting an example of the contents of a connection AP table 400.

FIG. 4 is a diagram depicting an example of the contents of the connection AP table 400. In FIG. 4, the connection AP table 400 stores the ESSIDs of the access points APi that performed connection to the network 210 from the mobile terminal apparatus 101. The mobile terminal apparatus 101 refers to the connection AP table 400 and is thereby, able to identify the ESSID of an access point APi available to the user of the mobile terminal apparatus 101, for example, ESSID-A and ESSID-B.

The contents of the connection AP table 400, for example, are updated when connection is first made to an access point APi. More specifically, for example, when connection is first made to an access point APi by a user operation, the ESSID of the connected access point APi is newly registered to the connection AP table 400.

A connection history table 500 used by the mobile terminal apparatus 101 will be described. The connection history table 500, for example, is realized by the memory 302 depicted in FIG. 3. The connection history information 110 depicted in FIG. 1 corresponds to the connection history table 500.

Figure 5:
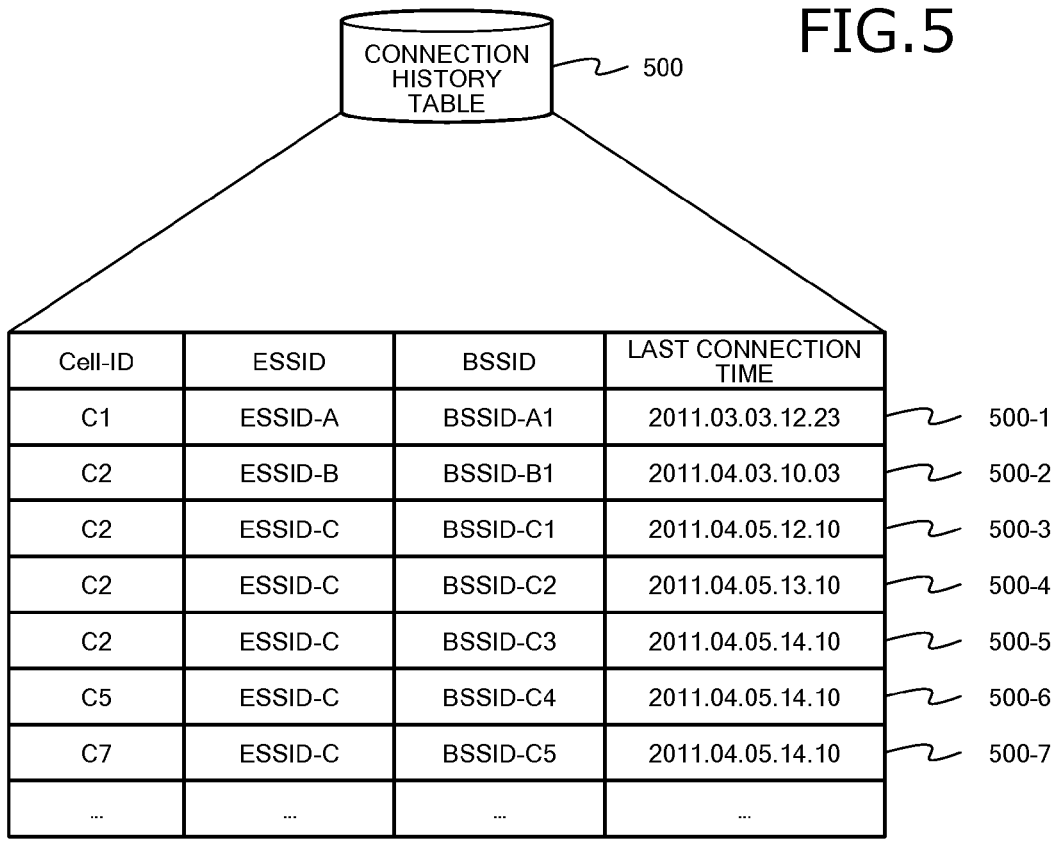
FIG. 5 is a diagram depicting an example of the contents of a connection history table 500.

FIG. 5 is a diagram depicting an example of the contents of the connection history table 500. In FIG. 5, the connection history table 500 has fields for cell-IDs, ESSIDs, BSSIDs, and last connection times. By setting information in the respective fields, connection history data (for example, connection history data 500-1 to 500-7) are stored as records.

The cell-ID is area identification information that identifies the cell Cj of a base station BSj of the mobile communications network. The ESSID is identification information that identifies an access point APi of the wireless LAN, and for example, is network identification information that identifies the network to which connection is made through access point APi. The BSSID is access point identification information that uniquely identifies the access point APi of the wireless LAN. The last connection time indicates the date and time at which the access point APi was connected to last.

Here, the connection history data 500-1 is taken as one example and indicates the cell-ID "C1", the ESSID "ESSID-A", the BSSID "BSSID-A1", and last connection time "2011.03.03.12.23" associated with one another. The date and time "2011/3/3_12:23" that the mobile terminal apparatus 101 last connected to the access point of the ESSID "ESSID-A" and the BSSID "BSSID-A1" in the cell C1 of the base station BS1 can be identified from the connection history data 500-1.

Figure 6:
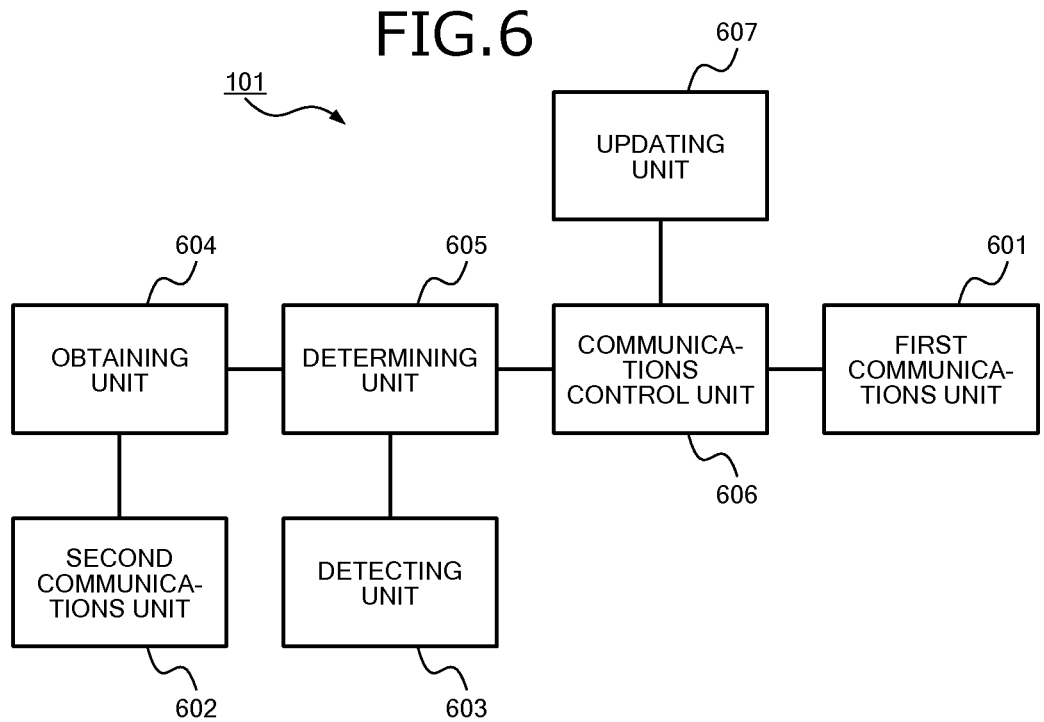
FIG. 6 is a block diagram depicting an example of a functional configuration of the mobile terminal apparatus 101 according to the first embodiment.

FIG. 6 is a block diagram depicting an example of a functional configuration of the mobile terminal apparatus 101 according to the first embodiment. In FIG. 6, the mobile terminal apparatus 101 includes a first communications unit 601, a second communications unit 602, a detecting unit 603, an obtaining unit 604, a determining unit 605, a communications control unit 606, and an updating unit 607. More specifically, for example, functions of the functional units are realized by executing on the CPU 301, a program stored in the memory 302 depicted in FIG. 3, or by the hardware of the public network I/F 305, the WLAN I/F 306, etc. Processing results obtained by the functional units are stored, for example, to the memory 302.

The first communications unit 601 has a function of communicating with an access point APi. More specifically, for example, the first communications unit 601 connects to the network 210 through an available access point APi. Further, the first communications unit 601 may ascertain whether the RSSI strength of the signal received from the connected access point APi has become a threshold or less.

The second communications unit 602 has a function of communicating with a base station BSj. More specifically, for example, the second communications unit 602 periodically receives (e.g., every 2.56 [sec]) from a communicable base station BSj among the base stations BS1 to BSn, base station information that includes the cell-ID of the cell Cj. If the cell-ID included in the received base station information differs from the cell-ID included in the base station information previously received, the mobile terminal apparatus 101, for example, registers the position of the mobile terminal apparatus 101 by communicating with the base station BSj.

The detecting unit 603 has a function of detecting transition of the display state of the display 303 (refer to FIG. 3) from non-display to display. More specifically, for example, the detecting unit 603 detects that the display state of the display 303 has transitioned from non-display to display when the display state of the display 303 has been switched from non-display to display by user operation via the keyboard 304.

More specifically, for example, the detecting unit 603 may detect that the display state of the display 303 has transitioned from non-display to display when the operation from the immediately previous state in which the display state of the display 303 becomes non-display, is resumed by a resume function. Further, for example, the detecting unit 603 may detect that the display state of the display 303 has transition from non-display to display when an application is invoked such as an alarm activated at a predetermined time.

The detecting unit 603 has a further function of detecting that the display state of the display 303 has transitioned from display to non-display. More specifically, for example, the detecting unit 603 detects that the display state of the display 303 has transitioned from display to non-display when the display state of the display 303 has changed from display to non-display consequent to user operation via the keyboard 304.

Further, for example, the detecting unit 603 may detect that the display state of the display 303 has transitioned from display to non-display when a screen OFF timer reaches a specified value. The screen OFF timer is a timer that measures the time that elapses until the display state of the display 303 transitions from display to non-display. Additionally, for example, the detecting unit 603 may detect that the display state of the display 303 has transitioned from display to non-display when the power supplied to the display 303 is suppressed and a power saving mode is transitioned to.

The obtaining unit 604 has a function of obtaining the cell-ID that identifies the cell Cj to which the mobile terminal apparatus 101 belongs among the cells C1 to Cn of the base stations BS1 to BSm. More specifically, for example, the obtaining unit 604 obtains as the cell-ID of the cell Cj to which the mobile terminal apparatus 101 belongs, the cell-ID included in the base station information received by the second communications unit 602.

Plural base stations with which the mobile terminal apparatus 101 can communicate may be present among the base stations BS1 to BSm. In this case, for example, the obtaining unit 604 may obtain as the cell-ID of the cell Cj to which the mobile terminal apparatus 101 belongs, the cell-ID included in the base station information of the base station for which radio wave strength is greatest among plural communicable base stations.

The determining unit 605 has a function of determining whether there is a past connection to an access point APi in the cell Cj to which the mobile terminal apparatus 101 belongs. Here, a past connection to an access point APi is connection history indicating that connection operations to an access point APi have been completed. Connection operations to an access point APi are a connection process of the mobile terminal apparatus 101, to connect to the network 210 through an access point APi.

More specifically, for example, if the detecting unit 603 has detected transition of the display state from non-display to display, the determining unit 605 refers to the connection history table 500 depicted in FIG. 5 and determines whether the cell-ID obtained by the obtaining unit 604 is registered. If the cell-ID is registered, the determining unit 605 determines that there is a past connection to an access point APi in the cell Cj to which the mobile terminal apparatus 101 belongs. On the other hand, if the cell-ID is not registered, the determining unit 605 determines that there is no past connection to an access point APi in the cell Cj to which the mobile terminal apparatus 101 belongs.

The communications control unit 606 has a function of controlling scanning operations of searching for an access point APi by the first communications unit 601. More specifically, for example, the communications control unit 606 controls the scanning operations of searching for an access point APi, based on a determination result obtained by the determining unit 605.

More specifically, for example, if the determining unit 605 determines that there is a past connection to an access point APi in the cell Cj to which the mobile terminal apparatus 101 belongs, the communications control unit 606 may control the first communications unit 601 to start periodic scanning operations of searching for an access point APi. On the other hand, if the determining unit 605 determines that there is no past connection to an access point APi in the cell Cj to which the mobile terminal apparatus 101 belongs, the communications control unit 606 may control the first communications unit 601 to suspend the periodic scanning operations of searching for an access point APi. A cycle T at which the periodic scanning operations are performed, for example, may be preset, and may be constant or not constant.

The communications control unit 606 has a further function of starting a connection process with respect to a found access point APi. More specifically, for example, the communications control unit 606 refers to the connection AP table 400 depicted in FIG. 4 and ascertains whether the ESSID of the found access point APi is registered. If the ESSID is registered, the communications control unit 606 controls the first communications unit 601 and executes the connection process with respect to the access point APi. On the other hand, if the ESSID is not registered, the communications control unit 606 does not execute the connection process with respect to the access point APi.

The communications control unit 606 may execute the connection process with respect to the found access point APi consequent to a user operation. More specifically, for example, when connection is first made to an access point APi, the communications control unit 606 controls the first communications unit 601 and executes the connection process with respect to the access point APi consequent to a user operation. In this case, the communications control unit 606 may newly register the ESSID of the connected access point APi into the connection AP table 400.

In the description hereinafter, an access point APi for which connection with the mobile terminal apparatus 101 has been completed and to which the mobile terminal apparatus 101 is connected, i.e., an access point APi that performs connection to the network 210 (refer to FIG. 2) from the mobile terminal apparatus 101 may be indicated as a "connected AP".

The communications control unit 606 has a further function of controlling handover by the first communications unit 601. More specifically, for example, if connection to an access point APi in the cell Cj has been completed, the communications control unit 606 searches the connection history table 500 for connection history data that includes the cell-ID of the cell Cj and the ESSID of the connected AP together with a BSSID that differs.

If plural connection history data are retrieved, the communications control unit 606 may cause the periodic scanning operations for an access point APi by the first communications unit 601 to start or to continue. As a result, when the possibility of a destination access point APi for handover being in a vicinity of the mobile terminal apparatus 101 is high, scanning operations to search for a destination access point APi for handover can be performed.

On the other hand, if 0 or 1 connection history data is retrieved, the communications control unit 606 may suspend the scanning operations of searching for an access point APi by the first communications unit 601. As a result, when the possibility of a destination access point APi for handover being in a vicinity of the mobile terminal apparatus 101 is low, the scanning operations to search for a destination access point APi for handover can be suspended.

In the description hereinafter, a scanning operation of searching for an access point APi to which connection is to be made may be indicated as a "first scanning operation".

The cycle of the first scanning operation, for example, may gradually increase up to 150 [sec], such as 10 [sec], 20 [sec], 60 [sec], 150 [sec], 150 [sec]. Further, a scanning operation of searching for a destination access point APi for handover may be referred to as a second scanning operation". The cycle of the second scanning operation, for example, may be a constant interval on the order of 10 seconds.

If the RSSI strength of the signal received from the connected AP becomes a threshold or less and plural connection history data are retrieved, the communications control unit 606 may cause the second scanning operation to start or to continue. As a result, if the strength of the radio waves from the connected AP drops and there is a high possibility of a destination access point APi for handover being in a vicinity of the mobile terminal apparatus 101, the second scanning operation can be performed. The threshold, for example, is set to a value on the order of −70 [dBm].

If the RSSI strength of the signal received from the connected AP becomes the threshold or less and, 0 or 1 connection history data is retrieved, the communications control unit 606 may cause the second scanning operation to be suspended. As a result, even when the strength of the radio waves from the connected AP drops, if there is a low possibility of a destination access point APi for handover being in a vicinity of the mobile terminal apparatus 101, the second scanning operation can be suspended.

The updating unit 607 has a function of updating the contents of the connection history table 500. More specifically, for example, the updating unit 607 updates the last connection time of an access point APi when connection to the access point APi is completed. More specifically, for example, the updating unit 607 searches the connection history table 500 for connection history data that corresponds to a combination of the cell-ID of the cell Cj to which the mobile terminal apparatus 101 belongs, and the ESSID and the BSSID of the connected AP. The updating unit 607 overwrites the last connection time field of the retrieved connection history data, with the connection time of the connected AP.

If there is no past connection to the connected AP in the cell Cj to which the mobile terminal apparatus 101 belongs, no connection history data is retrieved that corresponds to the combination of the cell-ID of the cell Cj to which the mobile terminal apparatus 101 belongs and, the ESSID and the BSSID of the connected AP. In this case, the updating unit 607 sets the cell-ID of the cell Cj to which the mobile terminal apparatus 101 belongs, the ESSID and the BSSID of the connected AP, and the connection time into the respective fields of the connection history table 500. As a result, new connection history data is registered in the connection history table 500 as a record.

The updating unit 607 may delete from the connection history table 500, the connection history data having the oldest last connection time, when a total count of the connection history data in the connection history table 500 becomes a given value or greater. As a result, the capacity of the memory 302 utilized for storing the connection history table 500 can be suppressed.

The communications control unit 606 may control the first communications unit 601 and suspend scanning operations (first scanning operation, second scanning operation) for searching for an access point APi, when the detecting unit 603 detects transition of the display state of the display 303, from display to non-display. As a result, scanning operations for an access point APi when the display state of the display 303 is non-display can be suppressed, enabling power consumption of the mobile terminal apparatus 101 to be suppressed.

If transition of the display state of the display 303, from display to non-display, has been detected, the communications control unit 606 may control the first communications unit 601 and suspend scanning operations for an access point APi after a given period has elapsed since transition of the display state to non-display. As a result, assuming that after the display state of the display 303 has transitioned from display to non-display, the display state immediately transitions from non-display to display, the scanning operations can be continued.

The scanning operations of searching for an access point APi include, for example, active scanning and passive scanning. Active scanning is a scanning operation that transmits a probe request signal to channels used by the wireless LAN and receives a probe response signal to thereby perform a scanning operation to search for an access point APi. Wireless LAN channels used for active scanning, for example, are the thirteen 2.4 [GHz] frequency bandwidth channels specified under 802.11 by the Institute of Electrical and Electronics Engineers, Inc. (IEEE).

Passive scanning is a scanning operation that receives from an access point APi, a signal (packet) called a beacon to thereby perform a scanning operation to search for an access point APi. Wireless LAN channels used for passive scanning, for example, are the four W52 (type) channels, the four W53 (type) channels, and the eleven W56 (type) channels specified under IEEE802.11.

As scanning operations of searching for an access point APi, the communications control unit 606 may control the first communications unit 601 and perform both active scanning and passive scanning, or any one among active scanning and passive scanning.

Examples of control processes of the mobile terminal apparatus 101 according to the first embodiment will be described with reference to FIGS. 7 to 9. In the description hereinafter, operations of portions of the control process of the mobile terminal apparatus 101 may be omitted.

Figure 7:
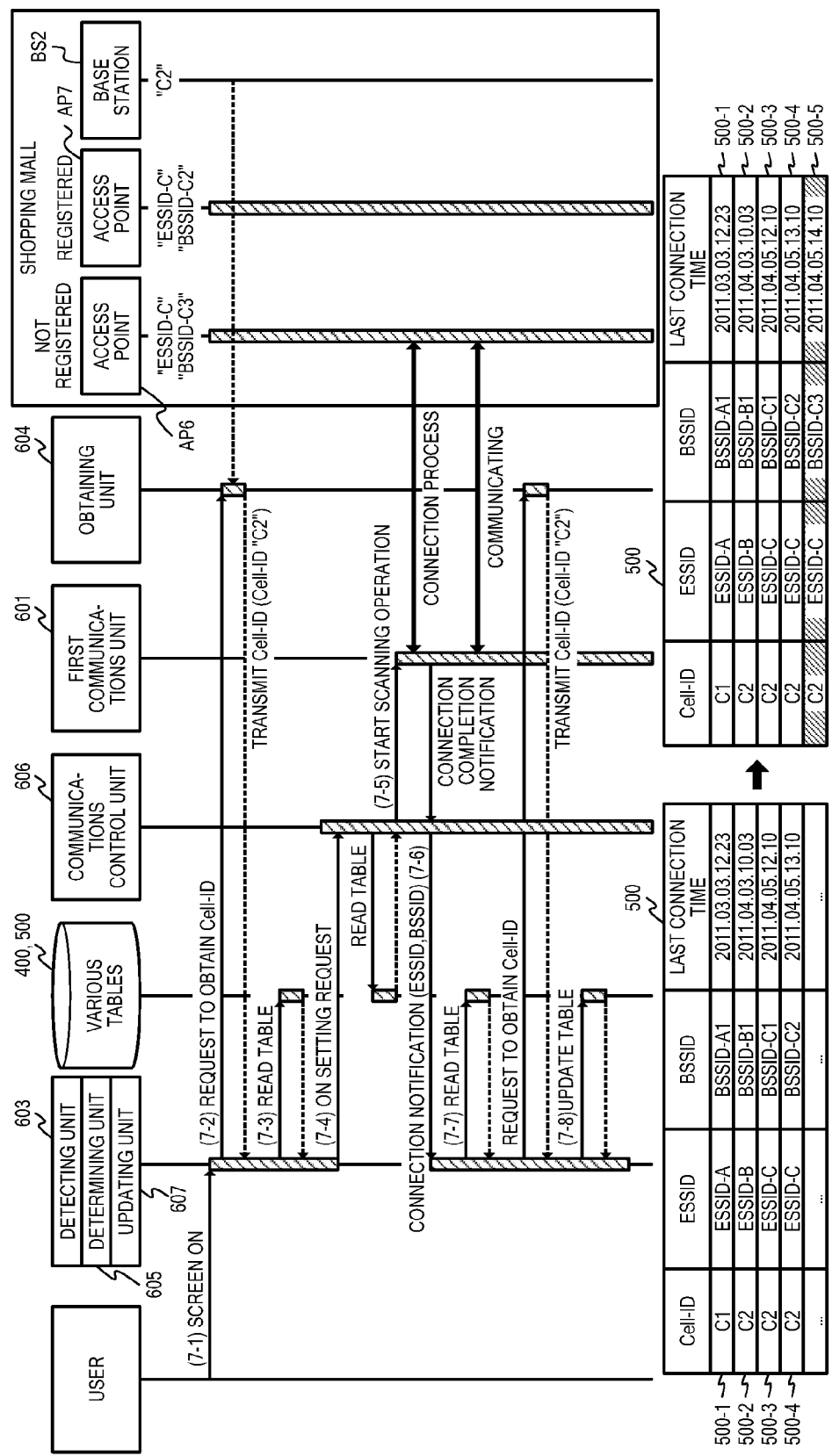
FIG. 7 is a diagram depicting an example of a first control process of the mobile terminal apparatus 101 according to the first embodiment.

FIG. 7 is a diagram depicting an example of a first control process of the mobile terminal apparatus 101 according to the first embodiment. The example of the first control process is an example of a control process of the mobile terminal apparatus 101, for updating the contents of the connection history table 500 at the time of connection to an access point APi.

In FIG. 7, (7-1) the detecting unit 603 detects transition of the display state of the display 303, from non-display to display. Here, as a result of the display state of the display 303 switching from non-display to display consequent to a user operation, transition of the display state of the display 303, from non-display to display, is detected.

(7-2) When transition of the display state from non-display to display is detected by the detecting unit 603, the determining unit 605 requests the obtaining unit 604 to obtain the cell-ID of the cell Cj to which the mobile terminal apparatus 101 belongs and thereby, obtains the cell-ID of the cell Cj. In the example depicted in FIG. 7, the cell-ID "C2" of the cell C2 is obtained.

(7-3) The determining unit 605 reads the connection history table 500 and determines whether there is a past connection to an access point APi in the cell Cj to which the mobile terminal apparatus 101 belongs. In the example depicted in FIG. 7, connection history data corresponding to the obtained cell-ID "C2" is registered and therefore, the determining unit 605 determines that there is a past connection to an access point APi.

(7-4) The determining unit 605 sends an ON setting request to the communications control unit 606, upon determining that there is a past connection to an access point APi in the cell Cj to which the mobile terminal apparatus 101 belongs. The ON setting request requests the start of the first scanning operation to search for an access point APi.

(7-5) The communications control unit 606 controls the first communications unit 601 and starts the first scanning operation to search for access point APi, upon receiving the ON setting request from the determining unit 605. In the example depicted in FIG. 7, the access point AP6 for which the ESSID is "ESSID-C" and the BSSID is "BSSID-C3" is assumed to be found as a result of performing the first scanning operation.

In the description hereinafter, an access point APi found as a result of performing the first scanning operation may be indicated as a "found AP".

The communications control unit 606 reads the connection AP table 400 and ascertains whether the ESSID of the found AP included in scanning results from the first communications unit 601 is registered in the connection AP table 400. Here, if the ESSID is registered, the communications control unit 606 controls the first communications unit 601 and performs the connection process with respect to the found AP. On the other hand, if the ESSID is not registered, the communications control unit 606 does not perform the connection process with respect to the found AP.

In the example depicted in FIG. 7, the ESSID of the found AP is assumed to be registered in the connection AP table 400. In this case, the communications control unit 606 controls the first communications unit 601 and performs the connection process with respect to the found AP. When connection to the access point APi is completed, connection completion notification is sent from the first communications unit 601 to the communications control unit 606. The connection completion notification gives notification that connection to the access point APi has been completed. The connection completion notification includes, for example, the ESSID and the BSSID of the connected AP.

(7-6) The communications control unit 606, upon receiving the connection completion notification from the first communications unit 601, sends connection notification to a registering unit. The connection notification gives notification that the access point APi is connected to. The connection notification includes, for example, the ESSID and the BSSID of the connected AP.

(7-7) The updating unit 607, upon receiving the connection notification from the communications control unit 606, reads the connection history table 500 and requests the obtaining unit 604 to obtain the cell-ID of the cell Cj to which the mobile terminal apparatus 101 belongs and thereby, obtains the cell-ID of the cell Cj to which the mobile terminal apparatus 101 belongs. In the example depicted in FIG. 7, the cell-ID "C2" of the cell C2 is obtained.

(7-8) The updating unit 607 updates the contents of the connection history table 500. In the example depicted in FIG. 7, the cell-ID "C2" of the cell C2 to which the mobile terminal apparatus 101 belongs and, the ESSID "ESSID-C", the BSSID "BSSID-C3" and the connection time "2011.04.05.14.10" of the connected AP are set into the respective fields of the connection history table 500, and as a result, the connection history data 500-5 is newly registered in the connection history table 500 as a record.

Figure 8:
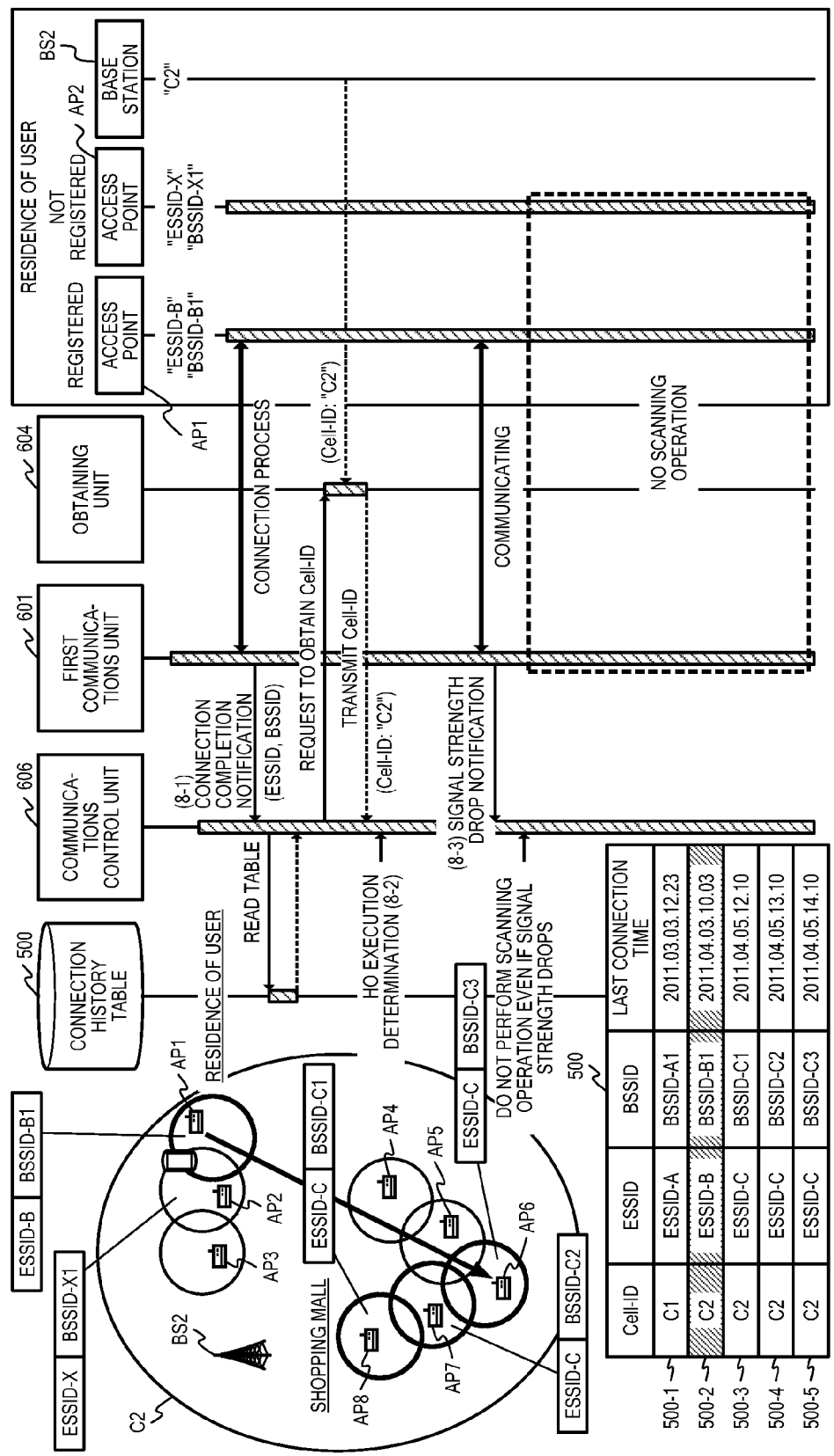
FIG. 8 is a diagram depicting an example of a second control process of the mobile terminal apparatus 101 according to the first embodiment.

FIG. 8 is a diagram depicting an example of a second control process of the mobile terminal apparatus 101 according to the first embodiment. The example of the second control process is an example of a control process of the mobile terminal apparatus 101 in a case where although the strength of the radio waves from the connected AP drops, handover is not performed.

In FIG. 8, (8-1) the communications control unit 606, upon receiving connection completion notification from the first communications unit 601, reads the connection history table 500 and requests the obtaining unit 604 to obtain the cell-ID of the cell Cj to which the mobile terminal apparatus 101 belongs and thereby, obtains the cell-ID of the cell Cj. In the example depicted in FIG. 8, the cell-ID "C2" of the cell C2 is obtained. Further, the connection completion notification includes the ESSID "ESSID-B" and the BSSID "BSSID-B1" of the connected AP.

(8-2) The communications control unit 606 ascertains whether handover by the first communications unit 601 is to be performed. More specifically, for example, the communications control unit 606 searches the connection history table 500 for connection history data in which the cell-ID "C2" of the cell C2 is set in the cell-ID field, and the ESSID "ESSID-B" of the connected AP is set in the ESSID field. In the example depicted in FIG. 8, the connection history data 500-2 is retrieved. In this case, the communications control unit 606 ascertains that handover is not to be performed by the first communications unit 601.

(8-3) The communications control unit 606 does not perform the second scanning operation of searching for a destination access point APi for handover, despite receiving signal strength drop notification from the first communications unit 601. The signal strength drop notification gives notification that the RSSI strength of the signal received from the connected AP has become a threshold or less.

In other words, since the access point AP2 that is in a vicinity of the access point AP1 to which the mobile terminal apparatus 101 is connected cannot be used by the mobile terminal apparatus 101, the communications control unit 606 does not start the second scanning operation even if the RSSI strength of the signal received from the access point AP1 drops. As a result, the power consumed for performing the second scanning operation in situations where there is no destination access point APi for handover can be saved.

Figure 9:
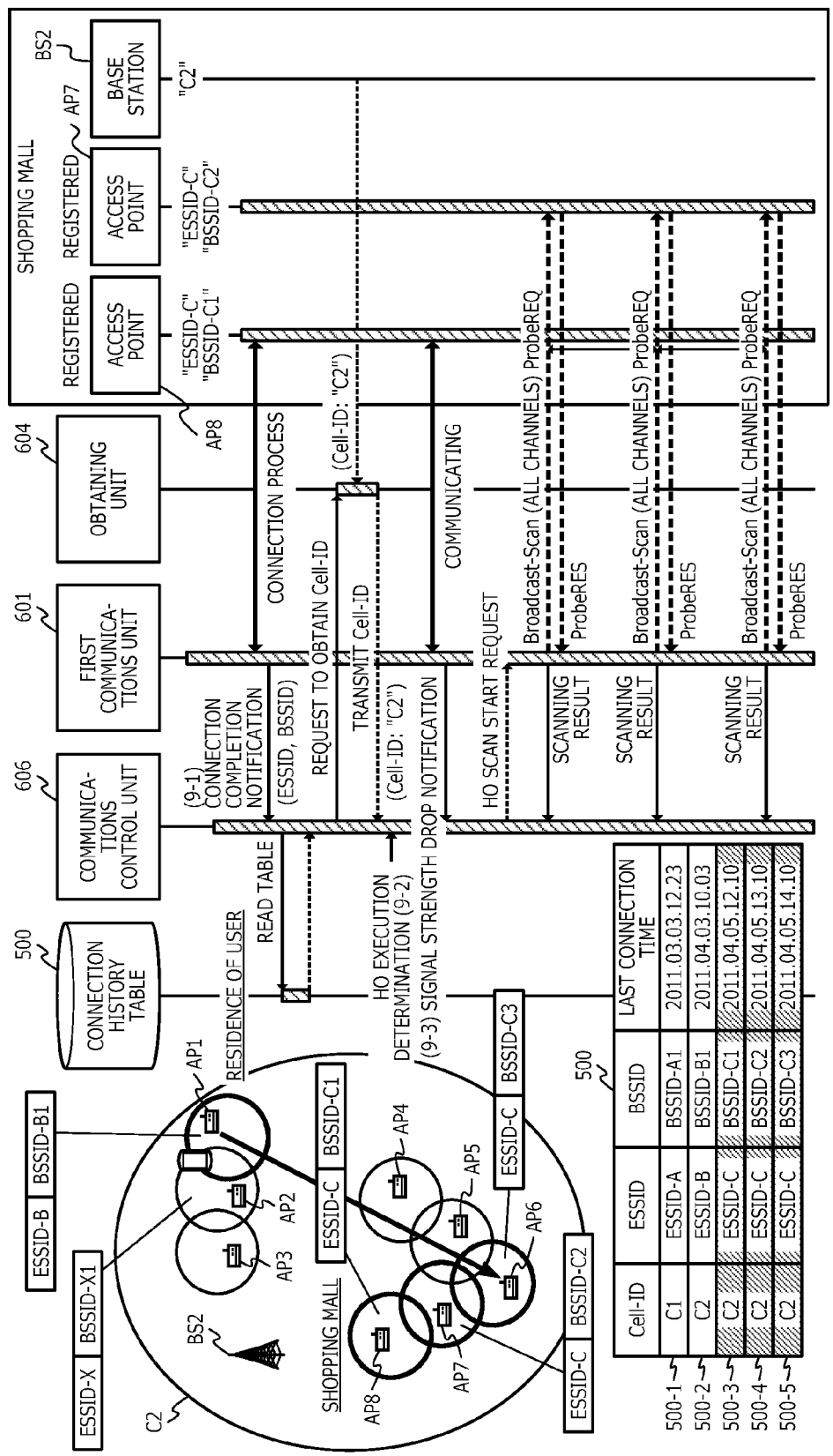
FIG. 9 is a diagram depicting an example of a third control process of the mobile terminal apparatus 101 according to the first embodiment.

FIG. 9 is a diagram depicting an example of a third control process of the mobile terminal apparatus 101 according to the first embodiment. The example of the third control process is an example of a control process of the mobile terminal apparatus 101 in a case where handover is performed when the strength of radio waves from the connected AP drops.

In FIG. 9, (9-1) the communications control unit 606, upon receiving connection completion notification from the first communications unit 601, reads the connection history table 500 and requests the obtaining unit 604 to obtain the cell-ID of the cell Cj to which the mobile terminal apparatus 101 belongs and thereby, obtains the cell-ID of the cell Cj. In the example depicted in FIG. 9, the cell-ID "C2" of the cell C2 is obtained. Further, the connection completion notification includes the ESSID "ESSID-C" and the BSSID "BSSID-C1" of the connected AP.

(9-2) The communications control unit 606 ascertains whether handover by the first communications unit 601 is to be performed. More specifically, for example, the communications control unit 606 searches the connection history table 500 for connection history data in which the cell-ID "C2" of the cell C2 is set in the cell-ID field, and the ESSID "ESSID-C" of the connected AP is sent in the ESSID field. In the example depicted in FIG. 9, the connection history data 500-3 to 500-5 are retrieved. In this case, the communications control unit 606 ascertains that handover by the first communications unit 601 is to be performed.

(9-3) The communications control unit 606, upon receiving signal strength drop notification from the first communications unit 601, sends an HO scan start request to the first communications unit 601. The HO scan start request requests the start of the second scanning operation to search for a destination access point APi for handover.

In other words, since the access point AP7, which can be used by the mobile terminal apparatus 101, is in the vicinity of the access point AP8 to which the mobile terminal apparatus 101 is connected, the communications control unit 606 performs the second scanning operation if the RSSI strength of the signal received from the access point AP8 drops. As a result, handover can be performed when the RSSI strength of the signal received from the connected AP drops, enabling ubiquity to be established.

Here, the access point AP7 is assumed to be found as a result of starting the second scanning operation by the first communications unit 601. In this case, the first communications unit 601, for example, calculates the difference of the RSSI strength of the signal received from the connected access point AP8 and the RSSI strength of the signal received from the access point AP7. If the difference of the RSSI strengths is a given value (for example, 10 [dBm]) or greater, the first communications unit 601 switches the access point APi to which connection is made, from the access point AP8 to the access point AP7.

Procedures of various processes of the mobile terminal apparatus 101 according to the first embodiment will be described. First, a procedure of a determining process by the mobile terminal apparatus 101 will be described. The determining process is a process of determining whether there is past connection to an access point APi in the cell Cj to which the mobile terminal apparatus 101 belongs.

Figure 10:
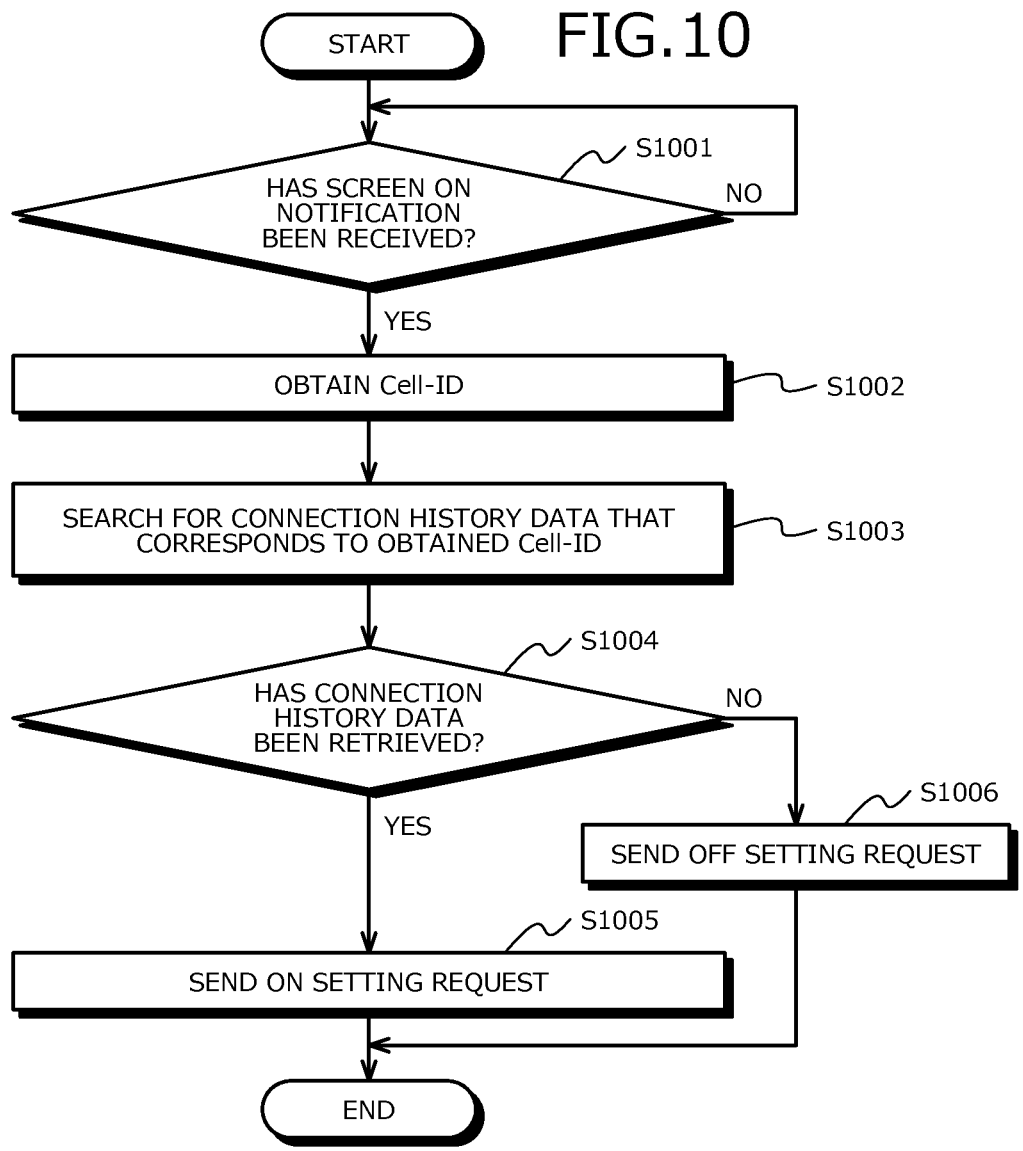
FIG. 10 is a flowchart depicting an example of a procedure of a determining process by the mobile terminal apparatus 101 according to the first embodiment.

FIG. 10 is a flowchart depicting an example of a procedure of the determining process by the mobile terminal apparatus 101 according to the first embodiment. In the flowchart depicted in FIG. 10, the determining unit 605 ascertains whether screen ON notification has been received from the detecting unit 603 (step S1001). The screen ON notification is notification indicating that the display state of the display 303 has transitioned from non-display to display.

The determining unit 605 awaits screen ON notification (step S1001: NO). When screen ON notification is received (step S1001: YES), the determining unit 605 requests the obtaining unit 604 to obtain the cell-ID of the cell Cj to which the mobile terminal apparatus 101 belongs and thereby, obtains the cell-ID of the cell Cj to which the mobile terminal apparatus 101 belongs (step S1002).

The determining unit 605 searches the connection history table 500 for connection history data that corresponds to the obtained cell-ID (step S1003). The determining unit 605 determines whether connection history data has been retrieved from the connection history table 500 (step S1004).

If connection history data has been retrieved (step S1004: YES), the determining unit 605 sends an ON setting request to the communications control unit 606 (step S1005), and ends the series of operations according to the flowchart.

On the other hand, if no connection history data has been retrieved (step S1004: NO), the determining unit 605 sends an OFF setting request to the communications control unit 606 (step S1006), and ends the series of operations according to the flowchart.

Thus, if there is a past connection to an access point APi in cell Cj to which the mobile terminal apparatus 101 belongs, the communications control unit 606 can be requested to start the first scanning operation of searching for an access point APi.

A procedure of an updating process by the mobile terminal apparatus 101 will be described. The updating process is a process of updating the contents of the connection history table 500.

Figure 11:
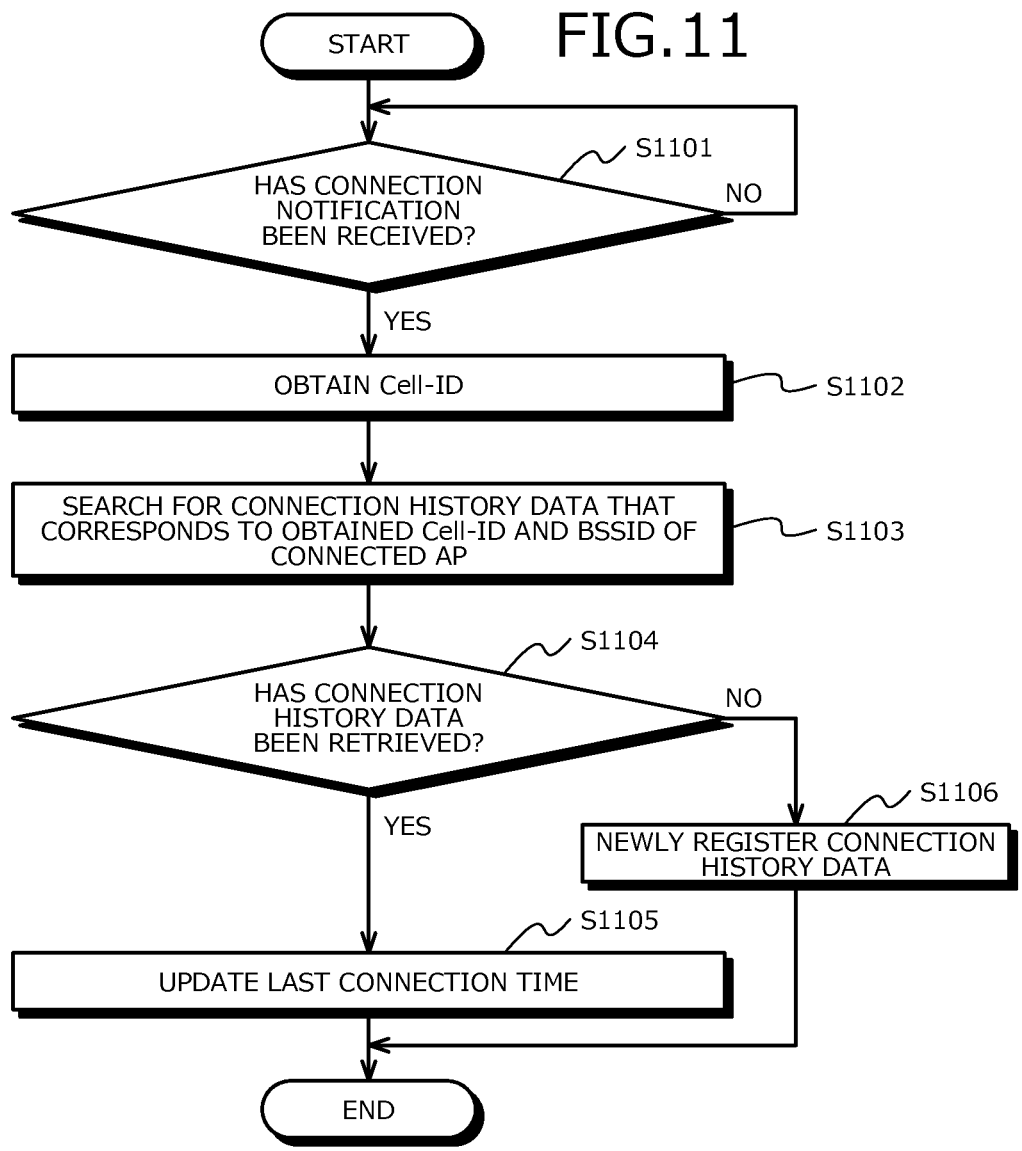
FIG. 11 is a flowchart depicting an example of a procedure of an updating process by the mobile terminal apparatus 101 according to the first embodiment.

FIG. 11 is a flowchart depicting an example of a procedure of the updating process by the mobile terminal apparatus 101 according to the first embodiment. In the flowchart depicted in FIG. 11, the updating unit 607 ascertains whether connection notification has been received from the communications control unit 606 (step S1101).

The updating unit 607 awaits connection notification (step S1101: NO). When connection notification is received (step S1101: YES), the updating unit 607 requests the obtaining unit 604 to obtain the cell-ID of the cell Cj to which the mobile terminal apparatus 101 belongs and thereby, obtains the cell-ID of the cell Cj to which the mobile terminal apparatus 101 belongs (step S1102).

The updating unit 607 searches the connection history table 500 for connection history data that corresponds to the obtained cell-ID and the BSSID of the connected AP (step S1103). The ESSID and the BSSID of the connected AP are identified from the connection notification received at step S1101.

The determining unit 605 ascertains whether connection history data has been retrieved from the connection history table 500 (step S1104). If connection history data has been retrieved (step S1104: YES), the updating unit 607 updates the last connection time of the retrieved connection history data (step S1105), and ends the series of operations according to the flowchart.

On the other hand, if no connection history data has been retrieved (step S1104: NO), the updating unit 607 sets the obtained cell-ID and, the ESSID, the BSSID and the connection time of the connected AP into the respective fields of the connection history table 500 and thereby, newly registers connection history data (step S1106), and ends the series of operations according to the flowchart.

Thus, the contents of the connection history table 500 can be updated at the time of connection to an access point APi.

A procedure of the first control process by the mobile terminal apparatus 101 will be described. The first control process is a process of controlling the first scanning operation of searching for an access point APi to which connection is to be made.

Figure 12:
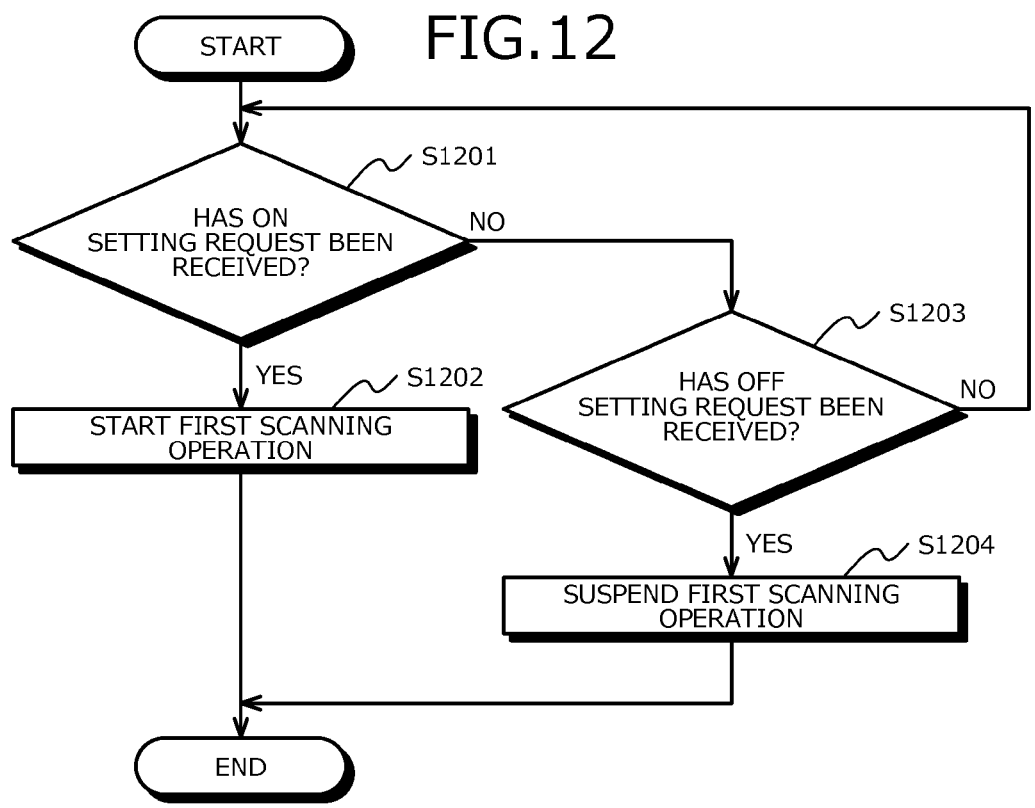
FIG. 12 is a flowchart depicting an example of a procedure of the first control process by the mobile terminal apparatus 101 according to the first embodiment.

FIG. 12 is a flowchart depicting an example of a procedure of the first control process by the mobile terminal apparatus 101 according to the first embodiment. In the flowchart depicted in FIG. 12, the communications control unit 606 ascertains whether an ON setting request has been received from the determining unit 605 (step S1201).

If an ON setting request has been received (step S1201: YES), the communications control unit 606 controls the first communications unit 601 and starts the first scanning operation of searching for an access point APi (step S1202), and ends the series of operations according to the flowchart. On the other hand, if no ON setting request has been received (step S1201: NO), the communications control unit 606 ascertains whether an OFF setting request has been received from the determining unit 605 (step S1203).

If no OFF setting request has been received (step S1203: NO), the communications control unit 606 returns to step S1201. On the other hand, if an OFF setting request has been received (step S1203: YES), the communications control unit 606 controls the first communications unit 601 and suspends the first scanning operation of searching for an access point APi (step S1204), and ends the series of operations according to the flowchart.

At step S1202, if the first scanning operation has already been started, the communications control unit 606 controls the first communications unit 601 and continues the first scanning operation. Further, at step S1204, if the first scanning operation has not been started, the communications control unit 606 ends the series of operations according to the flowchart.

Thus, if there is a past connection to an access point APi in the cell Cj to which the mobile terminal apparatus 101 belongs, the first scanning operation of searching for an access point APi can be started.

A procedure of the second control process by the mobile terminal apparatus 101 will be described. The second control process is a process of using the connection history table 500 and controlling the second scanning operation of searching for a destination access point APi for handover.

Figure 13:
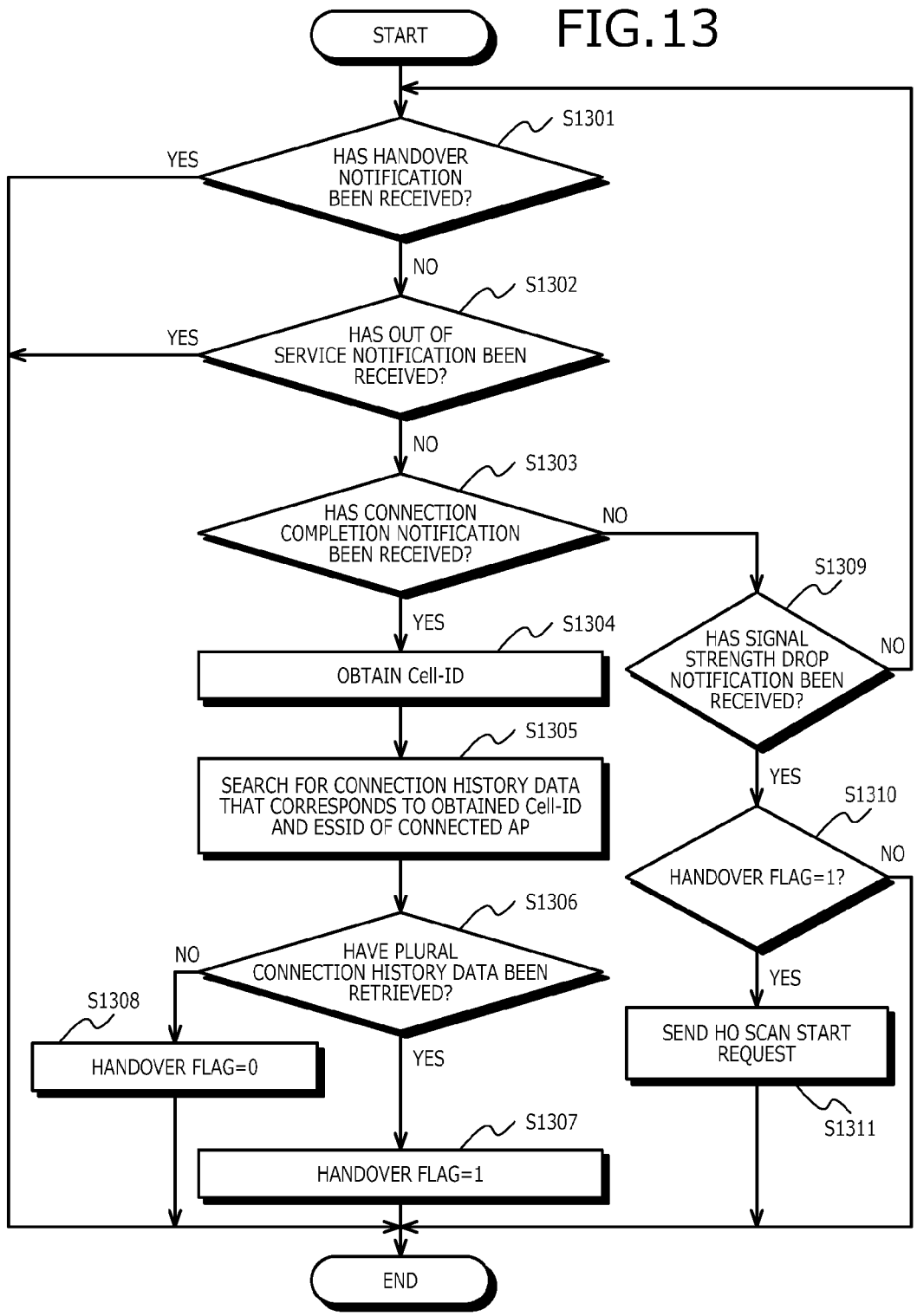
FIG. 13 is a flowchart depicting an example of a procedure of the second control process by the mobile terminal apparatus 101 according to the first embodiment.

FIG. 13 is a flowchart depicting an example of a procedure of the second control process by the mobile terminal apparatus 101 according to the first embodiment. In the flowchart depicted in FIG. 13, the communications control unit 606 ascertains whether handover notification has been received from the first communications unit 601 (step S1301). The handover notification gives notification that handover has been performed. The handover notification, for example, includes the ESSID and the BSSID of the connected AP.

If handover notification has been received (step S1301: YES), the communications control unit 606 ends the series of operations according to the flowchart. As a result, the communications control unit 606 can recognize the connected AP that has been switched to by handover.

On the other hand, if no handover notification has been received (step S1301: NO), the communications control unit 606 ascertains whether out of service notification has been received from the first communications unit 601 (step S1302). The out of service notification gives notification that the connection with the connected AP has been lost. The first communications unit 601, for example, sends out of service notification to the communications control unit 606 if the RSSI strength of the signal received from the connected AP becomes −90 [dBm] or less.

If out of service notification has been received (step S1302: YES), the communications control unit 606 ends the series of operations according to the flowchart. Thus, the communications control unit 606 can recognize that the connection with the connected AP has been lost.

On the other hand, if out of service notification has not been received (step S1302: NO), the communications control unit 606 ascertains whether connection completion notification has been received from the first communications unit 601 (step S1303). If connection completion notification has been received (step S1303: YES), the communications control unit 606 requests the obtaining unit 604 to obtain the cell-ID of the cell Cj to which the mobile terminal apparatus 101 belongs and thereby, obtains the cell-ID of the cell Cj to which the mobile terminal apparatus 101 belongs (step S1304).

The communications control unit 606 searches the connection history table 500 for connection history data that corresponds to the obtained cell-ID and the ESSID of the connected AP (step S1305). The ESSID and the BSSID of the connected AP are identified from the connection completion notification received at step S1303.

The communications control unit 606 ascertains whether plural connection history data have been retrieved from the connection history table 500 (step S1306). If plural connection history data have been retrieved (step S1306: YES), the communications control unit 606 sets a handover flag to "1" (step S1307), and ends the series of operations according to the flowchart.

The handover flag is a flag that indicates whether handover is to be performed if the strength of the radio waves from the connected AP drops. If the handover flag is "1", handover is to be performed; if the handover flag is "0", handover is not to be performed. The handover flag, for example, is stored in the memory 302.

At step S1306, if plural connection history data have not been retrieved (step S1306: NO), the communications control unit 606 sets the handover flag to "0" (step S1308), and ends the series of operations according to the flowchart.

At step S1303, if no connection completion notification has been received (step S1303: NO), the communications control unit 606 ascertains whether signal strength drop notification has been received from the first communications unit 601 (step S1309). If no signal strength drop notification has been received (step S1309: NO), the communications control unit 606 returns to step S1301.

On the other hand, if signal strength drop notification has been received (step S1309: YES), the communications control unit 606 ascertains whether the handover flag is set to "1" (step S1310). If the handover flag is set to "0" (step S1310: NO), the communications control unit 606 ends the series of operations according to the flowchart.

On the other hand, if the handover flag is set to "1" (step S1310: YES), the communications control unit 606 sends an HO scan start request to the first communications unit 601 (step S1311), and ends the series of operations according to the flowchart.

Thus, the second scanning operation of searching for a destination access point APi for handover can be started when the strength of radio waves from the connected AP drops and there is a high possibility of a destination access point APi for handover being in a vicinity of the mobile terminal apparatus 101.

As described, the mobile terminal apparatus 101 according to the first embodiment can ascertain whether an access point APi having the same ESSID as the connected AP is in the cell Cj to which the mobile terminal apparatus 101 belongs. As a result, it can be ascertained whether another available access point APi other than the connected AP is present in a vicinity of the mobile terminal apparatus 101.

The mobile terminal apparatus 101 starts the second scanning operation of searching for a destination access point APi for handover, if another available access point APi has been ascertained to be present near the mobile terminal apparatus 101. As a result, a destination access point APi for handover can be searched for efficiently.

The mobile terminal apparatus 101 does not perform the second scanning operation of searching for a destination access point APi for handover, if no other available access point APi has been ascertained to be present near the mobile terminal apparatus 101. As a result, meaningless scanning operations in situations where no destination access point APi for handover is present can be prevented, enabling the power consumption of the mobile terminal apparatus 101 to be suppressed.

The mobile terminal apparatus 101 starts the second scanning operation, if the RSSI strength of the signal received from the connected AP becomes a threshold or less and another available access point APi has been ascertained to be present near the mobile terminal apparatus 101. As a result, when the strength of the radio waves from the connected AP drops, a destination access point APi for handover can be searched for efficiently and ubiquity can be established.

The mobile terminal apparatus 101 does not perform the second scanning operation, if the RSSI strength of the signal received from the connected AP becomes a threshold or less and no other available access point APi has been ascertained to be present near the mobile terminal apparatus 101. As a result, even if the strength of the radio waves from the connected AP drops, if no destination access point APi for handover is ascertained to be in a vicinity of the mobile terminal apparatus 101, the second scanning operation is not performed, enabling the power consumption of the mobile terminal apparatus 101 to be suppressed.

The mobile terminal apparatus 101 according to a second embodiment will be described. In the second embodiment, the efficiency of the process of ascertaining whether to perform the second scanning operation of searching for a destination access point APi for handover when the strength of the radio waves from the connected APi drops, is enhanced by using a handover target list 1400 depicted in FIG. 14. Parts identical to those described in the first embodiment will be omitted from the drawings and the description hereinafter.

Figure 14:
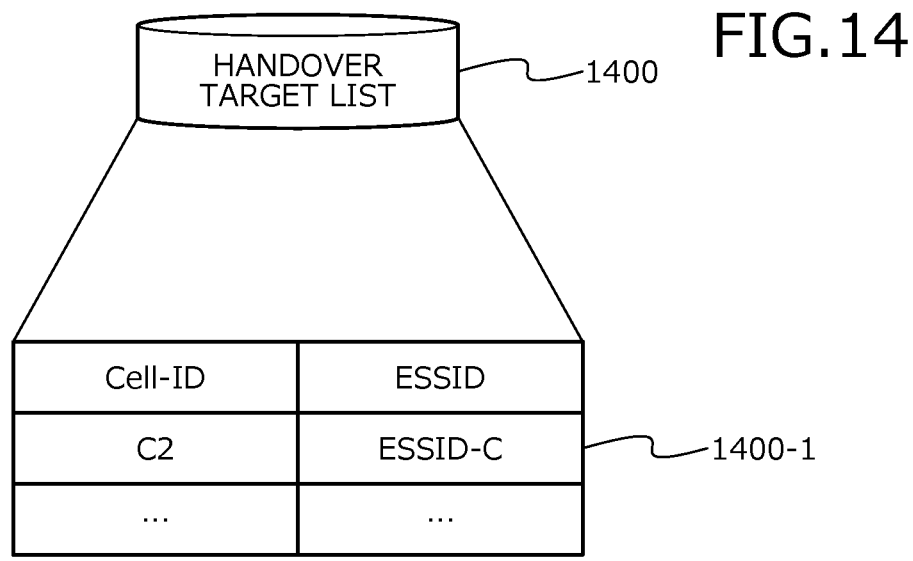
FIG. 14 is a diagram depicting an example of the contents of a handover target list 1400.

FIG. 14 is a diagram depicting an example of the contents of the handover target list 1400. In FIG. 14, the handover target list 1400 has fields for cell-IDs and ESSIDs, and by setting information into the respective fields, handover target data (e.g., handover target data 1400-1) is stored as a record.

The cell-ID is area identification information that identifies the cell Cj in which plural access points having the same ESSID are present. The ESSID is the ESSID of access points having the same ESSID in the cell Cj. From the handover target data 1400-1, it can be known that in the cell C2, there are plural access points having the ESSID "ESSID-C".

Examples of the control processes of the mobile terminal apparatus 101 according to the second embodiment will be described with reference to FIGS. 15 to 17. In the description hereinafter, operations of portions of the control process of the mobile terminal apparatus 101 may be omitted.

Figure 15:
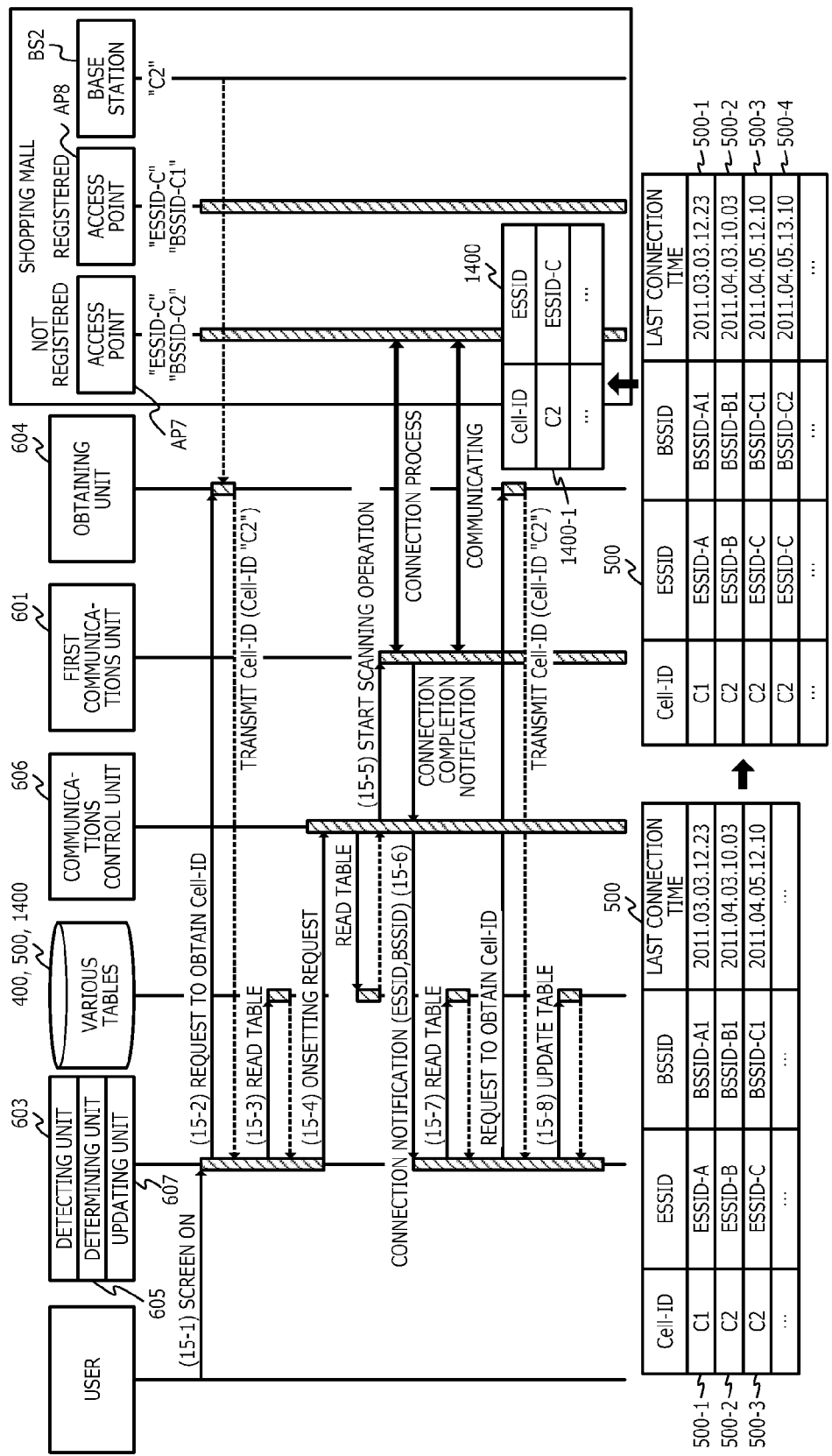
FIG. 15 is a diagram depicting an example of the first control process of the mobile terminal apparatus 101 according to a second embodiment.

FIG. 15 is a diagram depicting an example of the first control process of the mobile terminal apparatus 101 according to the second embodiment. The example of the first control process is an example of a control process of the mobile terminal apparatus 101, for updating the contents of the handover target list 1400 at the time of connection to an access point APi.

In FIG. 15, (15-1) the detecting unit 603 detects transition of the display state of the display 303, from non-display to display. Here, as a result of the display state of the display 303 switching from non-display to display consequent to a user operation, transition of the display state of the display 303, from non-display to display, is detected.

(15-2) When transition of the display state from non-display to display is detected by the detecting unit 603, the determining unit 605 requests the obtaining unit 604 to obtain the cell-ID of the cell Cj to which the mobile terminal apparatus 101 belongs and thereby, obtains the cell-ID of the cell Cj. In the example depicted in FIG. 15, the cell-ID "C2" of the cell C2 is obtained.

(15-3) The determining unit reads the connection history table 500 and determines whether there is a past connection to an access point APi in the cell Cj to which the mobile terminal apparatus 101 belongs. In the example depicted in FIG. 15, connection history data corresponding to the obtained cell-ID "C2" is registered and therefore, the determining unit 605 determines that there is a past connection to an access point APi.

(15-4) The determining unit 605 sends an ON setting request to the communications control unit 606, upon determining that there is a past connection to an access point APi in the cell Cj to which the mobile terminal apparatus 101 belongs.

(15-5) The communications control unit 606 controls the first communications unit 601 and starts the first scanning operation to search for an access point APi, upon receiving the ON setting request from the determining unit 605. In the example depicted in FIG. 15, the access point AP7 for which the ESSID is "ESSID-C" and the BSSID is "BSSID-C2" is assumed to be found as a result of performing the first scanning operation.

Further, in the example depicted in FIG. 15, the ESSID of the found AP is assumed to be registered in the connection AP table 400. In this case, the communications control unit 606 controls the first communications unit 601 and performs a connection process with respect to the found AP. When the connection to the access point APi is completed, connection completion notification is sent from the first communications unit 601 to the communications control unit 606.

(15-6) The communications control unit 606, upon receiving the connection completion notification from the first communications unit 601, sends connection notification to a registering unit.

(15-7) The updating unit 607, upon receiving the connection notification from the communications control unit 606, reads the connection history table 500 and requests the obtaining unit 604 to obtain the cell-ID of the cell Cj to which the mobile terminal apparatus 101 belongs and thereby, obtains the cell-ID of the cell Cj to which the mobile terminal apparatus 101 belongs. In the example depicted in FIG. 15, the cell-ID "C2" of the cell C2 is obtained.

(15-8) The updating unit 607 updates the contents of the connection history table 500. In the example depicted in FIG. 15, the cell-ID "C2" of the cell C2 to which the mobile terminal apparatus 101 belongs and, the ESSID "ESSID-C", the BSSID "BSSID-C2" and the connection time "2011.04.05.13.10" of the connected AP are set into the respective fields of the connection history table 500, and as a result, the connection history data 500-4 is newly registered in the connection history table 500 as a record.

(15-9) The updating unit 607 updates the contents of the handover target list 1400. More specifically, for example, the updating unit 607 searches the connection history table 500 for connection history data that corresponds to the combination of the cell-ID "C2" of the cell C2 to which the mobile terminal apparatus 101 belongs and the ESSID "ESSID-C" of the connected AP.

In the example depicted in FIG. 15, the connection history data 500-3 and 500-4 are retrieved from the connection history table 500. If plural connection history data are retrieved, the updating unit 607 sets the cell-ID of the cell Cj to which the mobile terminal apparatus 101 belongs and the ESSID of the connected AP into the respective fields of the handover target list 1400.

In the example depicted in FIG. 15, the connection history data 500-3 and 500-4 are retrieved, and the cell-ID "C2" of the cell C2 to which the mobile terminal apparatus 101 belongs and the ESSID "ESSID-C" of the connected AP are set into the respective fields of the handover target list 1400. As a result, the handover target data 1400-1 is newly registered in the handover target list 1400 as a record.

In other words, the updating unit 607 ascertains whether other than the registered connection history data 500-4, connection history data is registered that corresponds with the combination of the cell-ID "C2" of the cell C2 to which belongs the mobile terminal apparatus 101 and the ESSID "ESSID-C" of the connected AP. If such connection history data is not registered, the updating unit 607 newly registers the handover target data 1400-1 into the handover target list 1400.

Figure 16:
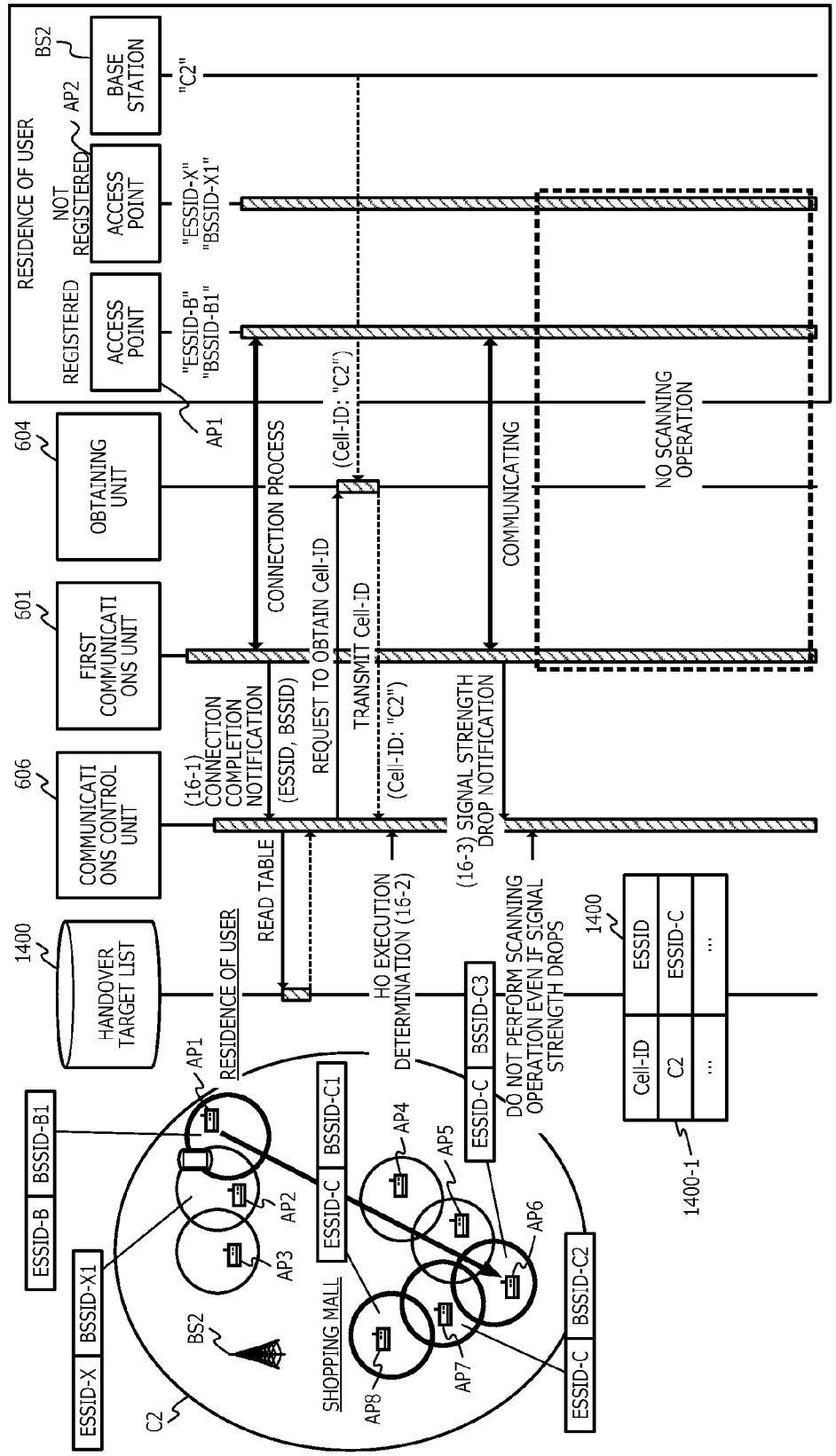
FIG. 16 is a diagram depicting an example of the second control process of the mobile terminal apparatus 101 according to the second embodiment.

FIG. 16 is a diagram depicting an example of the second control process of the mobile terminal apparatus 101 according to the second embodiment. The example of the second control process is an example of the control process of the mobile terminal apparatus 101 in a case where although the strength of the radio waves from the connected AP drops, handover is not performed.

In FIG. 16, (16-1) the communications control unit 606, upon receiving connection completion notification from the first communications unit 601, reads the handover target list 1400 and requests the obtaining unit 604 to obtain the cell-ID of the cell Cj to which the mobile terminal apparatus 101 belongs and thereby, obtains the obtains the cell-ID of the cell Cj. In the example depicted in FIG. 16, the cell-ID "C2" of the cell C2 is obtained. Further, the connection completion notification includes the ESSID "ESSID-B" and the BSSID "BSSID-B1" of the connected AP.

(16-2) The communications control unit 606 ascertains whether handover by the first communications unit 601 is to be performed. More specifically, for example, the communications control unit 606 searches the handover target list 1400 for handover target data in which the cell-ID "C2" of the cell C2 is set in the cell-ID field, and the ESSID "ESSID-B" of the connected AP is set in the ESSID field. In the example depicted in FIG. 16, no handover target data is retrieved. In this case, the communications control unit 606 ascertains that handover is not to be performed by the first communications unit 601.

(16-3) The communications control unit 606 does not perform the second scanning operation of searching for a destination access point APi for handover, despite receiving signal strength drop notification from the first communications unit 601. As a result, the power consumed for performing the second scanning operation in situations where there is no destination access point APi for handover can be saved.

FIG. 17 is a diagram depicting an example of the third control process of the mobile terminal apparatus 101 according to the second embodiment. The example of the third control process is an example of a control process of the mobile terminal apparatus 101 in a case where handover is performed when the strength of radio waves from the connected AP drops.

In FIG. 17, (17-1) the communications control unit 606 upon receiving connection completion notification from the first communications unit 601, reads the handover target list 1400 and requests the obtaining unit 604 to obtain the cell-ID of the cell Cj to which the mobile terminal apparatus 101 belongs and thereby, obtains the cell-ID of the cell Cj. In the example depicted in FIG. 17, the cell-ID "C2" of the cell C2 is obtained. Further, the connection completion notification includes the ESSID "ESSID-C" and the BSSID "BSSID-C3" of the connected AP.

(17-2) The communications control unit 606 ascertains whether handover by the first communications unit 601 is to be performed. More specifically, for example, the communications control unit 606 searches the handover target list 1400 for handover target data in which the cell-ID "C2" of the cell C2 is set in the cell-ID field and the ESSID "ESSID-C" of the connected AP is set in the ESSID field. In the example depicted in FIG. 17, the handover target data 1400-1 is retrieved. In this case, the communications control unit 606 ascertains that handover by the first communications unit 601 is to be performed.

(17-3) The communications control unit 606, upon receiving signal strength drop notification from the first communications unit 601, sends an HO scan start request to the first communications unit 601. As a result, handover can be performed when the RSSI strength of the signal received from the connected AP drops, enabling ubiquity to be established.

Procedures of various processes of the mobile terminal apparatus 101 according to the second embodiment will be described. First, a procedure of the updating process of the mobile terminal apparatus 101 will be described. The updating process is a process of updating the contents of the connection history table 500 and the contents of the handover target list 1400.

FIG. 18 is a flowchart depicting an example of a procedure of the updating process of the mobile terminal apparatus 101 according to the second embodiment. In the flowchart depicted in FIG. 18, the updating unit 607 ascertains whether connection notification has been received from the communications control unit 606 (step S1801).

The updating unit 607 awaits connection notification (step S1801: NO). When connection notification is received (step S1801: YES), the updating unit 607 requests the obtaining unit 604 to obtain the cell-ID of the cell Cj to which the mobile terminal apparatus 101 belongs and thereby, obtains the cell-ID of the cell Cj to which the mobile terminal apparatus 101 belongs (step S1802).

The updating unit 607 searches the connection history table 500 for connection history data that corresponds to the obtained cell-ID and the BSSID of the connected AP (step S1803). The determining unit 605 ascertains whether connection history data has been retrieved from the connection history table 500 (step S1804). If connection history data has been retrieved (step S1804: YES), the updating unit 607 updates the last connection time of the retrieved connection history data (step S1805), and ends the series of operations according to the flowchart.

On the other hand, if no connection history data has been retrieved (step S1804: NO), the updating unit 607 sets the obtained cell-ID and, the ESSID, the BSSID and the connection time of the connected AP into the respective fields of the connection history table 500 and thereby, newly registers connection history data (step S1806).

The updating unit 607 searches the connection history table 500 for connection history data that corresponds to the combination of the obtained cell-ID and the ESSID of the connected AP (step S1807). The updating unit 607 ascertains whether plural connection history data have been retrieved from the connection history table 500 (step S1808).

If plural connection history data have not been retrieved (step S1808: NO), the updating unit 607 ends the series of operations according to the flowchart. On the other hand, if plural connection history data have been retrieved (step S1808: YES), the updating unit 607 associates and registers the obtained cell-ID and the ESSID of the connected AP into the handover target list 1400 (step S1809), and ends the series of operations according to the flowchart.

As a result, the contents of the connection history table 500 and the contents of the handover target list 1400 can be updated at the time of connection to an access point APi.

A procedure of a control process of the mobile terminal apparatus 101 will be described. Here, the control process is a process of using the handover target list 1400 and controlling the second scanning operation of searching for a destination access point APi for handover.

FIG. 19 is a flowchart depicting an example of a procedure of the second control process of the mobile terminal apparatus 101 according to the second embodiment. In the flowchart depicted in FIG. 19, the communications control unit 606 ascertains whether handover notification has been received from the first communications unit 601 (step S1901). If handover notification has been received (step S1901: YES), the communications control unit 606 ends the series of operations according to the flowchart. As a result, the communications control unit 606 can recognize the connected AP that has been switched to by handover.

On the other hand, if no handover notification has been received (step S1901: NO), the communications control unit 606 ascertains whether out of service notification has been received from the first communications unit 601 (step S1902). If out of service notification has been received (step S1902: YES), the communications control unit 606 ends the series of operations according to the flowchart. Thus, the communications control unit 606 can recognize that the connection with the connected AP has been lost.

On the other hand, if out of service notification has not been received (step S1902: NO), the communications control unit 606 ascertains whether connection completion notification has been received from the first communications unit 601 (step S1903). If connection completion notification has been received (step S1903: YES), the communications control unit 606 requests the obtaining unit 604 to obtain the cell-ID of the cell Cj to which the mobile terminal apparatus 101 belongs and thereby, obtains the cell-ID of the cell Cj to which the mobile terminal apparatus 101 belongs (step S1904).

The communications control unit 606 searches the handover target list 1400 for handover target data that corresponds to the obtained cell-ID and the ESSID of the connected AP (step S1905). The ESSID of the connected AP is identified from the connection completion notification received at step S1903.

The communications control unit 606 ascertains whether handover target data has been retrieved from the handover target list 1400 (step S1906). If handover target data has been retrieved (step S1906: YES), the communications control unit 606 sets the handover flag to "1" (step S1907), and ends the series of operations according to the flowchart.

On the other hand, if no handover target data is retrieved (step S1906: NO), the communications control unit 606 sets the handover flag to "0" (step S1908), and ends the series of operations according to the flowchart.

At step S1903, if no connection completion notification has been received (step S1903: NO), the communications control unit 606 ascertains whether signal strength drop notification has been received from the first communications unit 601 (step S1909). If no signal strength drop notification has been received (step S1909: NO), the communications control unit 606 returns to step S1901.

On the other hand, if signal strength drop notification has been received (step S1909: YES), the communications control unit 606 ascertains whether the handover flag is set to "1" (step S1910). If the handover flag is set to "0" (step S1910: NO), the communications control unit 606 ends the series of operations according to the flowchart.

On the other hand, if the handover flag is set to "1" (step S1910: YES), the communications control unit 606 sends an HO scan start request to the first communications unit 601 (step S1911), and ends the series of operations according to the flowchart.

Thus, the second scanning operation of searching for a destination access point APi for handover can be started when the strength of radio waves from the connected AP drops and there is a high possibility of a destination access point APi for handover being in a vicinity of the mobile terminal apparatus 101.

As described, the mobile terminal apparatus 101 according to the second embodiment can control the second scanning operation, using the handover target list 1400 in which the ESSID of the connected AP for which handover should be performed is associated with the cell-ID and registered. As a result, compared to controlling the second scanning operation by using the connection history table 500, the processing load of the process of ascertaining whether handover is to be performed can be reduced.

The control method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to one aspect of the embodiments, an effect of suppressing power consumption can be achieved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A mobile terminal apparatus comprising:
    first communications circuitry that connects to a first network through a first access point;
    a storage device storing therein connection history information that includes plural entries respectively associating area identification information that identifies a communication area of a base station to which second communications circuitry connects, network identification information that identifies a network, and access point identification information that identifies an access point that connected to the network in the communication area; and
    a processor that when in a communication area of a first base station identified by first area identification information, the first communications circuitry is connected to the first network identified by first network identification information, determines whether plural entries including the first area identification information and the first network identification information together with different access point identification information with respect to each other between the plural entries have been retrieved from the connection history information, wherein
    the processor controls, when the plural entries including the different access point identification information with respect to each other between the plural entries have not been retrieved from the connection history information, the first communications circuitry to stop scanning operations to search for an access point different from the first access point in the communication area of the first base station based on a determination result.

2. The mobile terminal apparatus according to claim 1, wherein
    the processor, upon determining that from the connection history information, the plural entries have been retrieved that include the first area identification information and the first network identification information together with access point identification information that differs with respect to each other, continues a search by the first communications circuitry, for an access point included in the communication area of the first base station.

3. The mobile terminal apparatus according to claim 1, wherein
    the processor, upon determining that from the connection history information, zero or one entry has been retrieved that includes the first area identification information and the first network identification information together with access point identification information that differs with respect to each other, suspends a search by the first communications circuitry, for an access point included in the communication area of the first base station.

4. The mobile terminal apparatus according to claim 1, wherein
    the processor detects a strength of radio waves from the first access point that connected to the first network, and
    the processor, upon determining that the strength of the radio waves from the first access point that connected to the first network has dropped and that from the connection history information, plural entries have been retrieved that include the first area identification information and the first network identification information together with access point identification information that differs with respect to each other, continues a search by the first communications circuitry, for an access point in the communication area of the first base station.

5. The mobile terminal apparatus according to claim 1, wherein
    the processor detects a strength of radio waves from the first access point that connected to the first network, and
    the processor, upon determining that the strength of the radio waves from the first access point that connected to the first network has dropped and that from the connection history information, zero or one entry has been retrieved that include the first area identification information and the first network identification information together with access point identification information that differs with respect to each other, suspends a search by the first communications circuitry, for an access point included in the communication area of the first base station.

6. The mobile terminal apparatus according to claim 1, wherein
the processor, when in the communication area of the first base station identified by the first area identification information, the first communications circuitry newly connects, through the first access point identified by the first access point identification information, to the first network indicated by the first network identification information, determines whether an entry that includes the first area identification information and the first network identification information together with access point identification information that differs from the first access point identification information, has been registered in the connection history information,
the mobile terminal apparatus further comprises a second storage device that retains handover target data associated with the first area identification information and the first network identification information, when the processor determines that an entry that includes the first area identification information and the first network identification information together with access point identification information that differs from the first access point identification information, has been registered in the connection history information, and
the processor controls based on the handover target data retained by the second storage device.

7. A control method of a mobile terminal apparatus, the control method comprising:
connecting to a first network through a first access point, by first communications circuitry of the mobile terminal apparatus;
storing connection history information by a storage device of the mobile terminal apparatus, the connection history information including plural entries respectively associating area identification information that identifies a communication area of a base station to which second communications circuitry connects, identification information that identifies a network, and access point identification information that identifies an access point that connected to the network in the communication area;
determining whether plural entries that include first area identification information and first network identification information together with access point identification information that differs with respect to each other between the plural entries have been retrieved from the connection history information, the determining being performed by a processor of the mobile terminal apparatus when in a communication area of a first base station identified by the first area identification information, the first communications circuitry has connected to the first network identified by the first network identification information; and
controlling the first communications circuitry by the processor, to stop scanning operations to search for an access point different from the first access point in the communication area of the first base station when the plural entries including the different access point identification information with respect to each other between the plural entries have not been retrieved from the connection history information, based on a determination result by the processor.

8. A non-transitory, computer-readable recording medium storing therein a control program of a mobile terminal apparatus, the control program causing the mobile terminal apparatus to execute a process comprising:
connecting to a first network through a first access point, by first communications circuitry of the mobile terminal apparatus;
storing connection history information by a storage device of the mobile terminal apparatus, the connection history information including plural entries respectively associating area identification information that identifies a communication area of a base station to which second communications circuitry connects, identification information that identifies a network, and access point identification information that identifies an access point that connected to the network in the communication area;
determining whether plural entries that include first area identification information and first network identification information together with access point identification information that differs with respect to each other between the plural entries have been retrieved from the connection history information, the determining being performed by a processor of the mobile terminal apparatus when in a communication area of a first base station identified by the first area identification information, the first communications circuitry has connected to the first network identified by the first network identification information; and
controlling the first communications circuitry by the processor, to stop scanning operations to search for an access point different from the first access point in the communication area of the first base station when the plural entries including the different access point identification information with respect to each other between the plural entries have not been retrieved from the connection history information, based on a determination result by the processor.

* * * * *